US011840197B2

(12) United States Patent
Niemela et al.

(10) Patent No.: US 11,840,197 B2
(45) Date of Patent: Dec. 12, 2023

(54) VEHICLE MOUNTED ACCESSORY

(71) Applicant: NB4 Brand L.L.C., Chassell, MI (US)

(72) Inventors: Marcus Niemela, Scottsdale, AZ (US);
Cal G. Niemela, Chassell, MI (US);
Michael R. Jackson, Hancock, MI (US)

(73) Assignee: The Kingstar Company, Chassell, MI (US)

( * ) Notice: Subject to any disclaimer, the term of this patent is extended or adjusted under 35 U.S.C. 154(b) by 331 days.

(21) Appl. No.: 17/100,004

(22) Filed: Nov. 20, 2020

(65) Prior Publication Data
US 2021/0146842 A1 May 20, 2021

Related U.S. Application Data

(60) Provisional application No. 63/009,028, filed on Apr. 13, 2020, provisional application No. 62/937,937, filed on Nov. 20, 2019.

(51) Int. Cl.
*B60R 3/02* (2006.01)
*B60R 9/06* (2006.01)
(52) U.S. Cl.
CPC . *B60R 3/02* (2013.01); *B60R 9/06* (2013.01)
(58) Field of Classification Search
CPC .. B60R 3/02; B60R 3/007; B60R 9/06; B60R 9/0485
See application file for complete search history.

(56) References Cited

U.S. PATENT DOCUMENTS

| 2,642,217 | A | * | 6/1953 | Jennings | B60R 3/02 280/166 |
| 3,913,811 | A | * | 10/1975 | Spencer | B60R 9/06 224/508 |
| 4,139,078 | A | * | 2/1979 | Keller | E06C 5/02 280/166 |
| 4,347,638 | A | * | 9/1982 | Weaver | B60R 3/02 182/115 |
| 5,228,707 | A | * | 7/1993 | Yoder | B60R 3/02 182/127 |
| 5,280,934 | A | * | 1/1994 | Monte | B60R 3/02 182/127 |
| 5,312,150 | A | * | 5/1994 | Quam | B62D 33/0273 296/57.1 |

(Continued)

Primary Examiner — Jeffrey J Restifo
(74) Attorney, Agent, or Firm — Gardner, Linn, Burkhart & Ondersma LLP

(57) ABSTRACT

A vehicle-mountable accessory for a vehicle includes an access platform or landing for accessing a portion of the vehicle. The accessory is removably coupled to the vehicle. The access platform may be pivotably operable between a stowed configuration for travel and a deployed configuration that provides access to the vehicle. A deployable step or set of stairs nest under or inside of the body of the access platform and slideably deploy from the access platform to provide additional access to reach the access platform. The stairs are returned to a nested configuration for travel. The set of stairs may also pivot during deployment to improve vertical access to the access platform. The accessory includes a storage unit for storage and support of various equipment, tools, and accessories. A piece of equipment, such as a generator, can be securely mounted on top of the storage unit.

20 Claims, 20 Drawing Sheets

(56) References Cited

U.S. PATENT DOCUMENTS

| | | | | |
|---|---|---|---|---|
| 5,626,440 | A * | 5/1997 | Greene, Jr. | E02B 3/20 |
| | | | | 405/218 |
| 5,653,459 | A * | 8/1997 | Murphy | B60R 3/007 |
| | | | | 280/166 |
| 6,425,457 | B1 * | 7/2002 | Lundry | E06C 1/005 |
| | | | | 182/35 |
| 7,516,997 | B2 * | 4/2009 | Kuznarik | B62D 33/0273 |
| | | | | 182/127 |
| 9,527,448 | B1 * | 12/2016 | Kay | E06C 5/28 |
| 9,771,025 | B1 * | 9/2017 | Nebel | B60R 3/02 |
| 9,994,141 | B1 * | 6/2018 | Hanser | B60R 3/02 |
| 10,098,314 | B2 * | 10/2018 | Murray | A01K 1/0272 |
| 10,104,864 | B2 * | 10/2018 | Murray | A01K 1/035 |
| 10,518,708 | B1 * | 12/2019 | Honer | B60R 3/02 |
| D937,730 | S * | 12/2021 | Hamilton | D12/203 |
| 2018/0228118 | A1 * | 8/2018 | Murray | A01K 1/0272 |
| 2018/0228119 | A1 * | 8/2018 | Murray | A01K 1/0272 |
| 2019/0037799 | A1 * | 2/2019 | Murray | A01K 1/0272 |
| 2021/0146842 | A1 * | 5/2021 | Niemela | B60R 11/06 |
| 2022/0009418 | A1 * | 1/2022 | Demonte | B60R 3/02 |
| 2022/0185189 | A1 * | 6/2022 | Houston | B60R 3/02 |
| 2022/0314890 | A1 * | 10/2022 | Sands, II | B60R 3/02 |
| 2023/0100518 | A1 * | 3/2023 | Denz | B60R 3/02 |
| | | | | 182/97 |

* cited by examiner

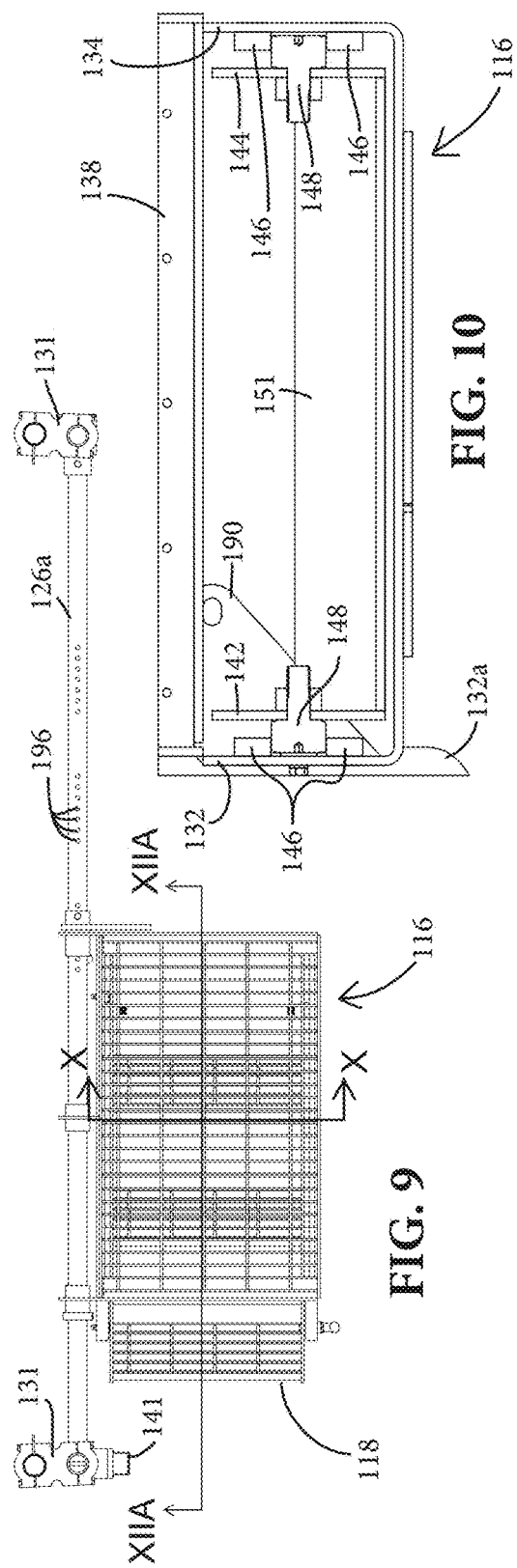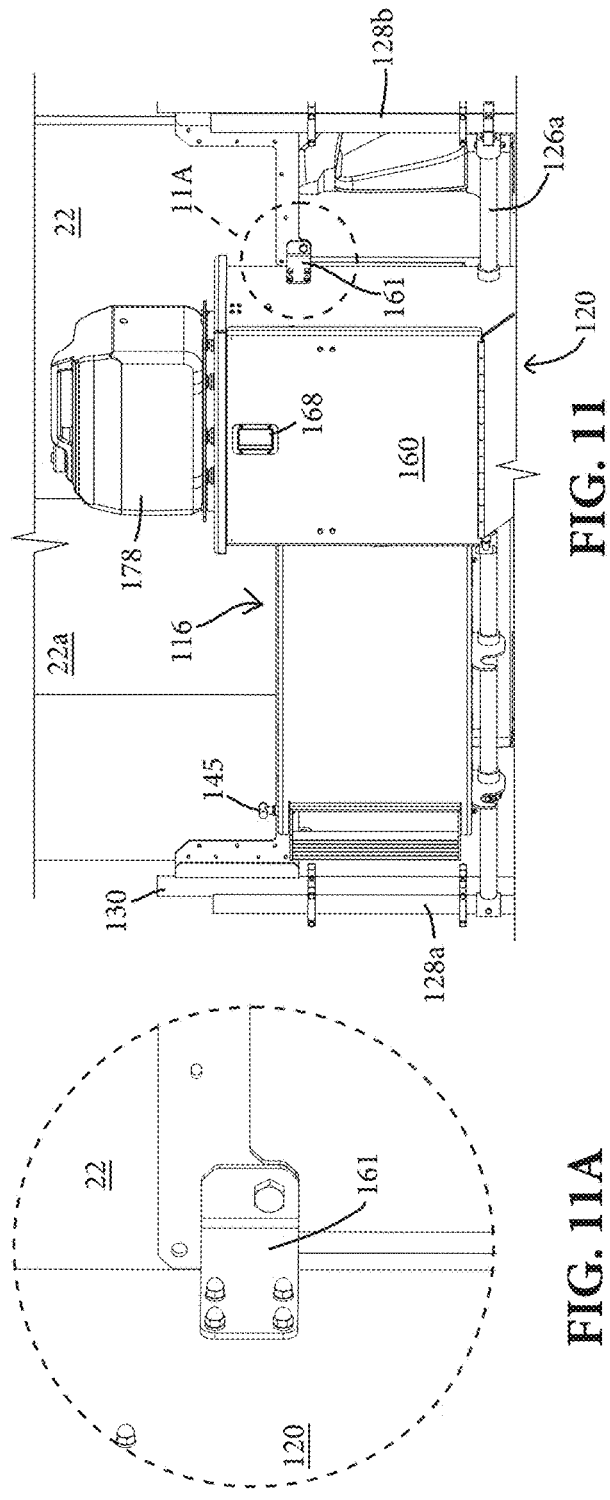

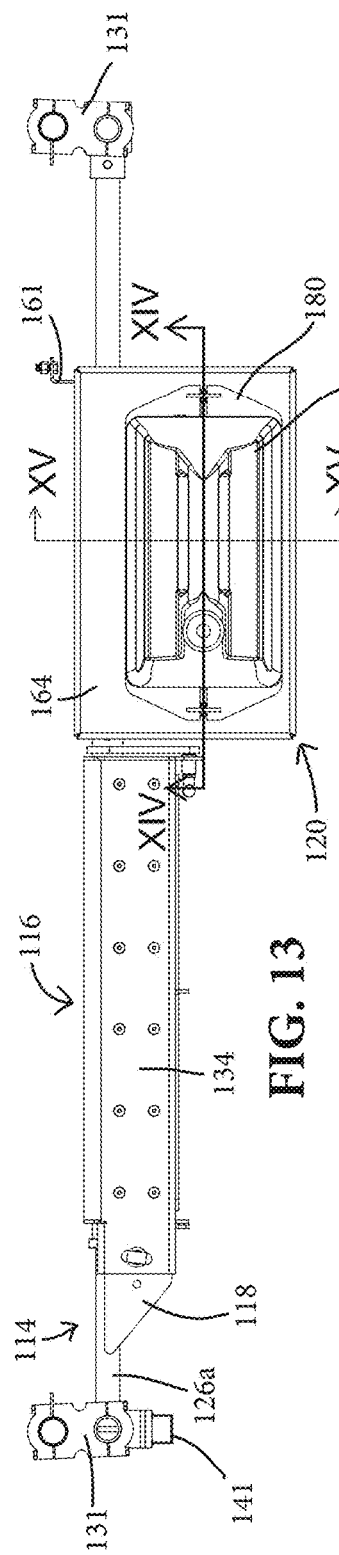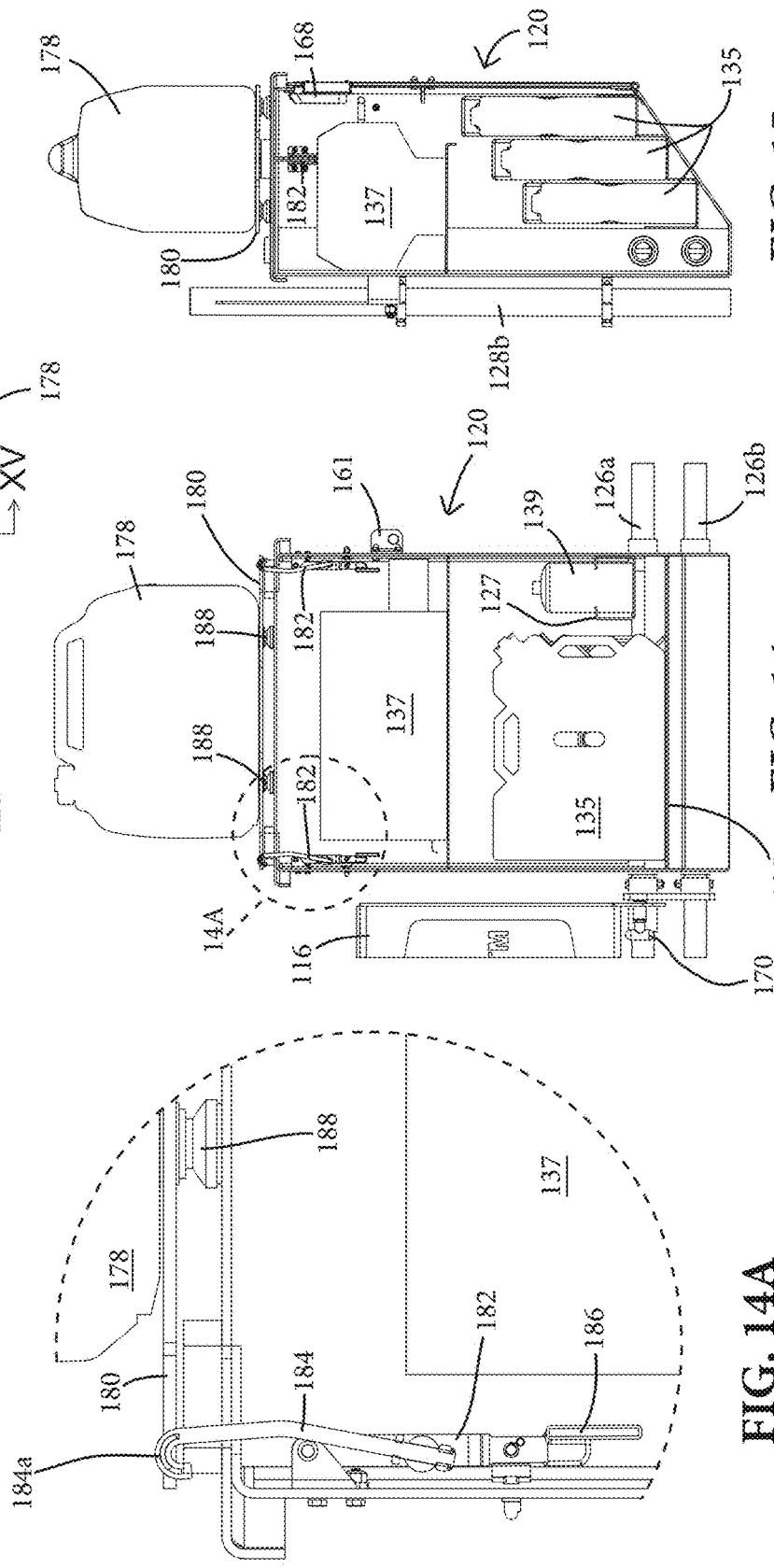

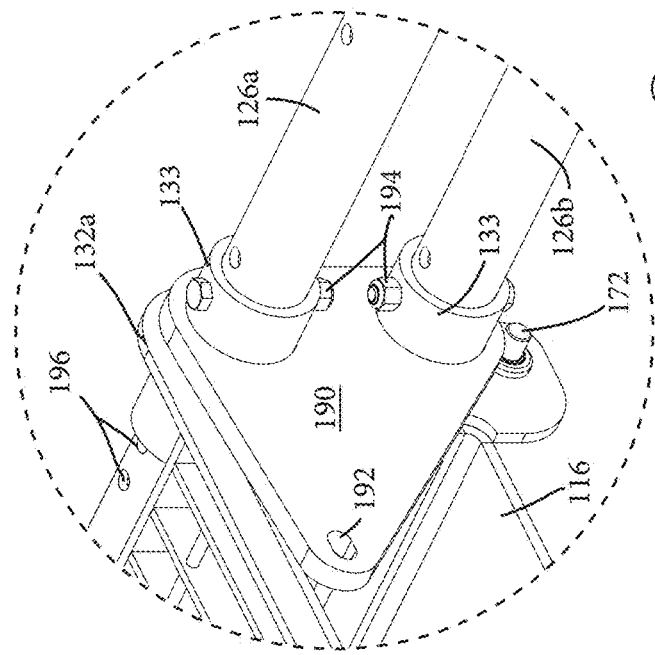
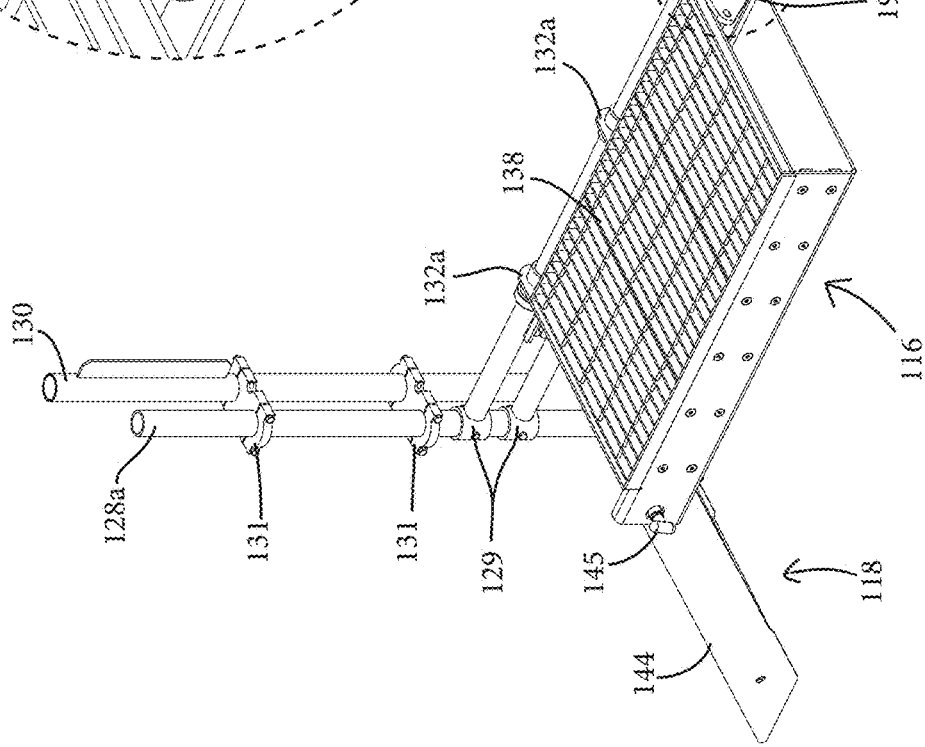
FIG. 16A
FIG. 16

VEHICLE MOUNTED ACCESSORY

CROSS REFERENCE TO RELATED APPLICATIONS

The present application claims priority of U.S. provisional applications Ser. No. 62/937,937 filed Nov. 20, 2019, and Ser. No. 63/009,028 filed Apr. 13, 2020, which are hereby incorporated herein by reference in their entireties.

FIELD OF THE INVENTION

The present invention relates to accessibility and storage features for vehicles, such as trucks, trailers, and campers.

BACKGROUND OF THE INVENTION

Truck beds of pickup trucks are difficult to access because of the height of the truck bed relative to the ground. Options for accessing a truck bed for those who are not able or do not want to lift themselves into the truck bed include the use of portable ramps, portable ladders, and backing the truck up to a ramp or elevated surface. Secure storage of equipment that is often used with trucks, campers, and trailers often requires the user of such equipment to unload the equipment from a secure interior portion of the vehicle, setup the equipment for use, and then reload the equipment into the vehicle after use to prevent theft or damage of the equipment.

SUMMARY OF THE INVENTION

The present invention provides, in its various forms, a vehicle-mountable accessory that includes an integrated vehicle access platform and storage space for various equipment. The access platform provides a porch or place to stand for a user proximate an exterior portion of a vehicle to allow the user to gain easier access to that portion of the vehicle. The integrated access platform may include a deployable stairway to provide easier access to the access platform. The access platform may be deployable so that it can be stowed for travel and deployed to provide vehicle access. The storage space provides secure storage for various equipment, tools, or accessories. The vehicle mounted accessory is removably mounted on a vehicle or on a vehicle-mounted living quarter, such as a pickup truck, a trailer, a camper, or a truck-bed mounted camper unit. In some configurations, such as for a truck with a truck bed mounted camper unit, the accessory may be coupled to both the truck and the camper unit. The accessory is removably coupled to the vehicle so that it can be stored apart from the vehicle.

According to one form of the present invention, a vehicle mounted accessory includes a support frame to removably couple the accessory to the vehicle. The vehicle mounted accessory includes an access platform coupled to a portion of the support frame. The access platform is configured to provide an exterior access platform, standing surface, or porch to provide a user a place to stand and access an exterior portion of the vehicle, such as proximate a door to a truck-bed mounted camper. The accessory platform includes a storage unit or bin coupled to a portion of the support frame adjacent the access platform, the storage unit provided to store accessories, equipment, or tools, such as fuel tanks and cooking supplies.

In one aspect, the deployable access platform is pivotably coupled to the support frame such that the access platform is operable to pivot between a stowed platform configuration and a deployed platform configuration. The access platform includes a frame with a receiving opening at one end of the frame. The vehicle mounted accessory includes a deployable stair disposed at a portion of the access platform. The deployable stair is deployable between a stowed stair configuration and a deployed stair configuration. In the deployed configuration, the stair provides a stairway for a user to more easily access the access platform. Optionally, the deployable stair includes a pair of stair stringers and a plurality of stair treads disposed in spaced arrangement perpendicular to and between the stringers. The access platform and the storage bin may be slideably coupled to the support frame such that the platform and storage bin can slide side-to-side relative to the support frame to be repositioned as desired by the user.

In another aspect, the deployable stair is configured to nest within a frame of the access platform and the deployable stair is operable to slideably deploy from the access platform and to then pivot downward at an oblique angle to provide access to the access platform. The access platform frame may include a pair of guide pins, each guide pin disposed on a proximal end portion of one of the stair stringers to support the stringer at the access platform. The access platform may further include a guide channel disposed on an interior of a sidewall of a frame of the access platform. The guide channel guides and supports the guide pin while the deployable stair is moving between the nested/stowed stair configuration and a deployed stair configuration. The deployable stair is operable to slide out from the access platform until the guide pin reaches an end of the guide channel. When the guide pin is at the end of the guide channel the deployable stair is operable to pivot about the guide pin. The deployable stair includes a stop located proximate the proximal ends of the stringers to abut an end portion of the access platform frame and support the deployable stair at an orientation wherein the stair treads are parallel to the standing surface portion of the access platform.

In yet another aspect, the support frame has a hitch receiver mount and/or a vertical support and a coupling collar, for removably mounting the accessory on the vehicle. The coupling collar can removably couple the vertical support to a jack support of a truck-bed mounted camper that is mounted on the vehicle. Optionally, the hitch receiver mount comprises a removable extension that is insertable into a hitch receiver channel that extends from a front portion of said support frame to a rear portion of said support frame. When the removable extension is fully inserted into the channel, a portion of the removable extension extends beyond a rear end of the channel and the exposed portion of the removable extension is thus insertable into a hitch receiver of the vehicle. The support frame may include a stabilizer unit to reduce movement of the vehicle mounted accessory relative to the vehicle when the vehicle mounted accessory is mounted to the vehicle.

In a further aspect, a top panel, a pair of side panels, a back panel, a bottom panel, and an access door cooperate with one another to define the storage bin. The access door is operable to access an interior space of the storage bin. Optionally, the storage bin includes a lock for securing the access door. The top panel may be capable of supporting a functional accessory, such as an electricity generator. The electricity generator can be secured to the top panel, such as with bolts passing through the top panel. Because the bolts securing the generator to the top panel are accessed from the interior of the storage bin, when the storage bin is locked, the generator is effectively locked to the storage bin. Optionally, the vehicle mounted accessory includes an accessory coupling platform that is removably coupled to the storage unit at an upper panel of the storage unit. The accessory coupling platform is attached to a functional accessory, such as an electricity generator, and the coupling platform secures the functional accessory to the storage unit. The accessory coupling platform may be removeably coupled to the storage unit with toggle clamps, folding latches, or other suitable releasable coupling device.

In still another aspect, the vehicle mounted accessory includes a slidable storage unit, such as a drawer, that is operably coupled to the support frame. The slidable storage unit includes an accessible interior for storage of equipment and accessories. The accessible interior of the slidable storage unit may be nestable within a portion of the support frame.

According to another form of the present invention, a vehicle mounted accessory is provided that includes a support frame, an access platform, and a storage unit. The access platform is supported by the support frame and provides an area for a user to stand proximate a portion of a vehicle, such as outside of a door of a camper unit that is mounted in the bed of a truck. The vehicle mounted accessory is removeably mountable to the vehicle such that it may be selectively mounted or removed from the vehicle as desired. The storage unit is supported on the support frame and may include a closet, a drawer, or a bin for storing various types of equipment, such as camping gear, tools, and animal tack or food. The support frame includes a hitch receiver mount for mounting in a vehicle hitch receiver and a stabilizer unit to reduce or substantially prevent movement of the accessory relative to the vehicle when the accessory is mounted to the vehicle. The stabilizer unit may rest on a portion of the vehicle, such as the top of a bumper on the vehicle to reduce or prevent pivoting or tilting of the vehicle mounted accessory relative to the vehicle.

Therefore, the vehicle mounted accessory of the present invention provides increased or easier access to an exterior portion of a vehicle, such as a truck bed or a truck-bed mounted camper door. The deployable access platform of the accessory includes a porch or standing platform to allow a user to stand proximate an exterior portion of a vehicle that would otherwise be difficult to access. The access platform may be pivotably stowable for travel and storage and deployable to provide the porch access platform. A storage bin provides secure storage space for accessories and equipment such as tools and fuel tanks. The storage bin can also provide support for equipment, such as an electricity generator. The storage bin can be locked to secure equipment, including the equipment supported on the storage bin. The accessory is removably mounted to the vehicle to allow the accessory to be stored independent of the vehicle.

These and other objects, advantages, purposes, and features of the present invention will become more apparent upon review of the following specification in conjunction with the drawings.

BRIEF DESCRIPTION OF THE DRAWINGS

FIG. 9 is a top plan view of the vehicle mounted accessory of FIG. 6, depicted with a deployable stair in a stowed position and with a storage unit omitted;

FIG. 10 is a sectional side elevation view of the platform portion of the vehicle mounted accessory taken along Line X-X in FIG. 9;

FIG. 11 is a right rear perspective view of portions of the vehicle mounted accessory of FIG. 7;

FIG. 11A is an enlarged view of the region designated 11A in FIG. 11;

FIG. 13 is a top plan view of the vehicle mounted accessory of FIG. 7;

FIG. 14 is a sectional rear elevation view of the vehicle mounted accessory taken along Line XIV-XIV in FIG. 13;

FIG. 14A is an enlarged view of the region designated 14A in FIG. 14;

FIG. 15 is a sectional rear elevation view of the vehicle mounted accessory taken along Line XV-XV in FIG. 13;

FIG. 16 is a right-rear perspective view of the vehicle mounted accessory of FIG. 6, depicted with a deployable stair in a fully deployed position and with a storage unit omitted to show underlying structure;

FIG. 16A is an enlarged view of the region designated 16A in FIG. 16;

FIG. 22A is an enlarged view of the region designated 22A in FIG. 22;

FIG. 22B is an enlarged view of the region designated 22B in FIG. 22;

DETAILED DESCRIPTION OF THE PREFERRED EMBODIMENTS

Figure 1:
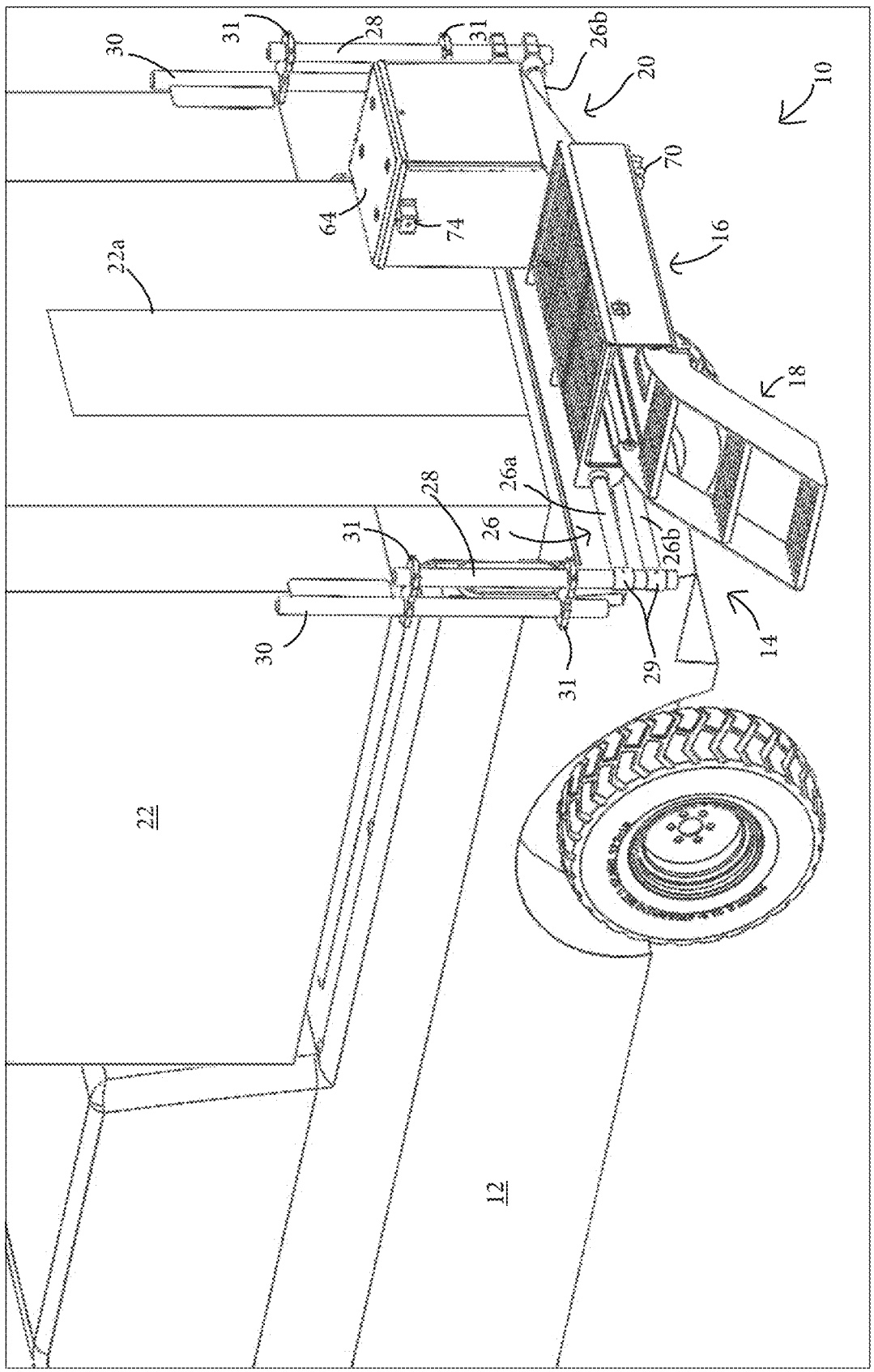
FIG. 1 is a left-rear perspective view of a vehicle mounted accessory in accordance with an embodiment of the present invention, shown mounted to a rear of a truck that is also supporting a truck camper.
Figure 2A:
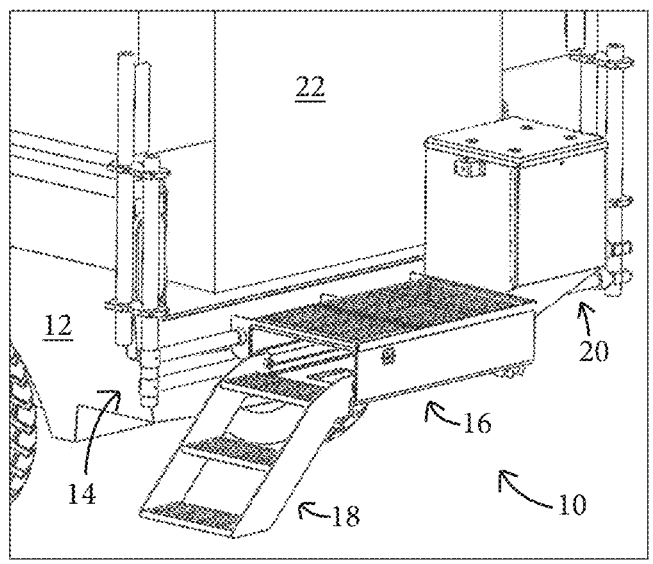
FIGS. 2A-2C are left-rear perspective views of the vehicle mounted accessory and truck of FIG. 1, depicting sequential steps of stowing of an access platform portion of the vehicle mounted accessory.
Figure 2B:
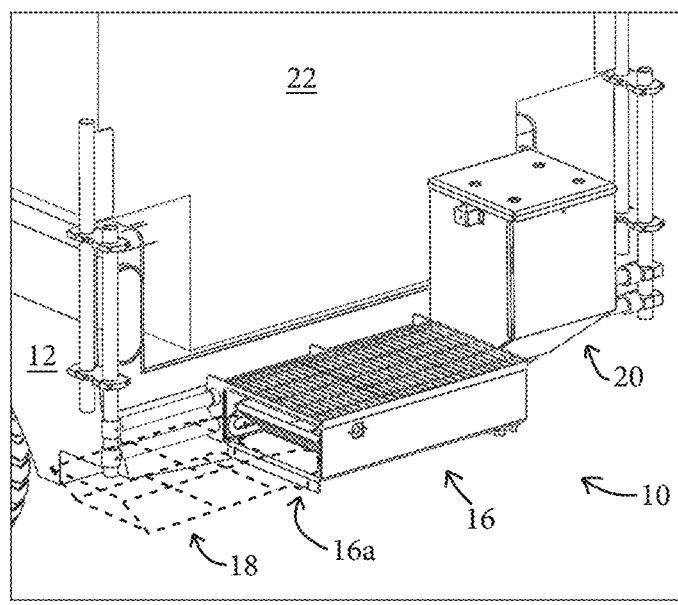
Figure 2C:
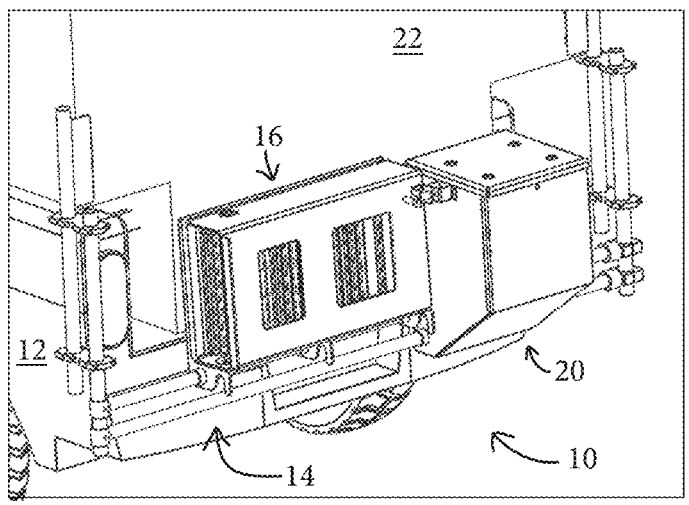

Referring now to the drawings and the illustrative embodiments depicted therein, a vehicle mounted accessory 10 for mounting to a vehicle 12 includes a support frame 14 and an access platform or "porch" 16 that provides an exterior standing surface or platform proximate the vehicle 12 (FIG. 1). The platform 16 may be selectively deployable to extend and retract relative to a side or rear of the vehicle 12, such as shown in FIGS. 1-2C. The platform 16 allows a user to access an exterior portion of the vehicle that would otherwise be difficult to access, such as a bed of a truck or the elevated access door of truck-bed mounted camper unit. A deployable step or stair frame 18 is coupled to the access platform 16 and can be deployed from the access platform 16 to provide a stairway or step to access the access platform 16. The accessory 10 includes an accessory storage unit or bin 20 to provide storage or support for various accessories, tools, or equipment. The vehicle mounted accessory 10 may be removably coupled to the vehicle 12, which is illustrated as a truck, but which could also be a camper or trailer, for example, to provide increased access to a portion of the vehicle 12.

Figure 3:
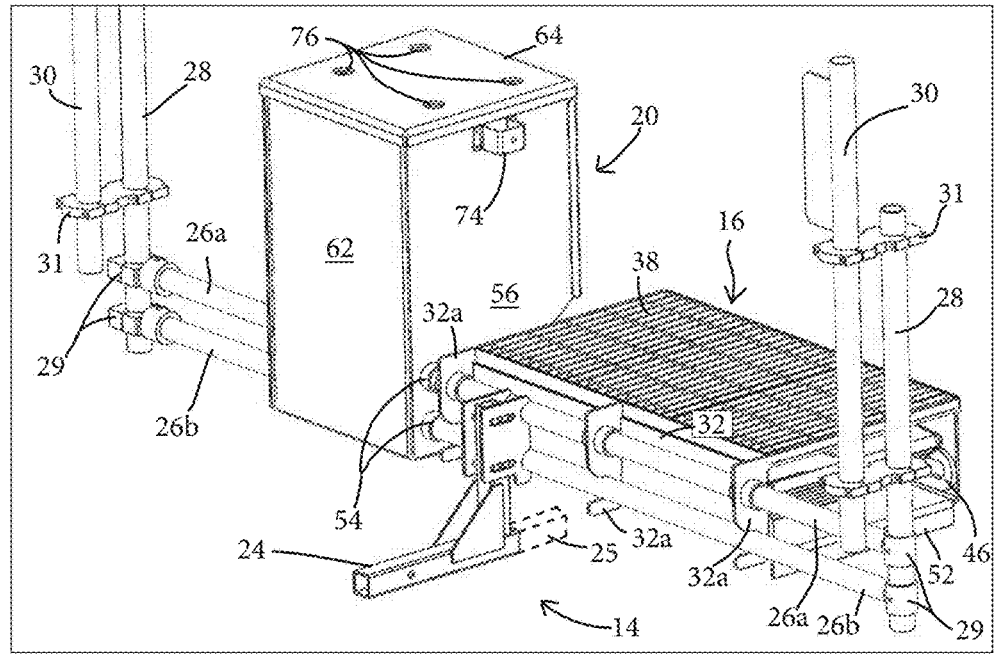
FIG. 3 is a left-front perspective view of the vehicle mounted accessory of FIG. 1.

As shown in FIGS. 1-5D, vehicle mounted accessory 10 is removably coupled to the rear of a pickup truck vehicle 12 and is configured to provide access to a truck mounted camper 22 that is mounted on the vehicle 12. Support frame 14 of the accessory 10 is removably installed or coupled to the vehicle 12 and configured to support a deployable access platform 16 and an accessory storage bin 20 proximate the rear of the vehicle 12. The support frame 14 includes a vehicle hitch receiver mount 24 to removably couple the accessory 10 to a hitch receiver of the vehicle 12, such as shown in FIG. 3. The support frame 14 may include other types of vehicle attachments, such as vehicle frame mounts. The support frame 14 includes an accessory support rack 26 fixedly coupled to the receiver mount 24 to support the access platform 16, storage bin 20, and other accessories on the accessory 10 (FIG. 1). The support frame 14 may include a hitch receiver extension 25, as shown in phantom in FIG. 3, to enable a trailer to be hitched to the vehicle 12 while the vehicle mounted accessory 10 is installed on the vehicle 12.

The support rack 26 includes a pair of horizontal rails 26a, 26b that are fixedly coupled to the vehicle mount 24 (FIGS. 1 and 3). The access platform 16 and storage bin 20 may be slideably mounted to the rails 26a, 26b such that the platform 16 and bin 20 may slide horizontally along the rails 26a, 26b on the support rack 26 to be positioned as desired by the user relative to the vehicle 12, such as to align with a door 22a of the camper 22. While the support rails 26a, 26b of the illustrated embodiments are represented as round tubes, the rails 26a, 26b may be other shapes, such as square, rectangular, or oval tubes, I-beams, T-beams, or other structural beam shapes. The support frame 14 includes a vertical support 28 coupled to each end of the support rack 26 with rack coupling collars 29 (FIG. 1). The vertical supports 28 are secured to respective vertical jack supports 30 of the camper 22. The vertical supports 28 reduce or prevent the accessory 10 from pivoting or tilting about the receiver mount 24. Accessory coupling collars 31 are disposed between the vertical supports 28 and the jack supports 30 to secure the vertical supports 28 to the jack supports 30. The accessory coupling collars 31 may be adjustable to allow for height adjustments between the vertical supports 28 and jack supports 30. Alternatively, the vertical supports 28 may be the only vehicle mount of the support frame 14, such that no hitch receiver mount is provided.

In the illustrated embodiment of FIGS. 1-5D, the deployable access platform 16 is pivotably coupled to the upper rail 26a of the support rack 26. The access platform 16 is operable to pivot about the upper rail 26a between a stowed configuration wherein the platform 16 is substantially vertical above the support rack 26 and upright relative the vehicle 12 (FIG. 2C) and a deployed configuration wherein the platform 16 is substantially horizontal relative to the vehicle 12 and the support rack 26, or substantially parallel to a plane defined along the vehicle's longitudinal and lateral axes so as to provide a standing surface (FIG. 2B). The access platform 16 includes a rectangular frame including an inward sidewall 32 proximate the upper rail 26a (FIG. 3), an outward sidewall 34 spaced apart from the upper rail 26a, a bottom panel 36, and a top platform 38 that provides a support or standing surface for a user or equipment when the access platform 16 is in the deployed configuration. An opening formed at one end of the rectangular frame of the access platform 16 defines a receiving end 16a of the platform that is adapted to receive a deployable stair frame 18 (FIG. 2B). The top platform 38 may include grating, treading, or grip tape to increase friction and provide safety for a user or operator traversing the top platform 38.

Figure 5A:
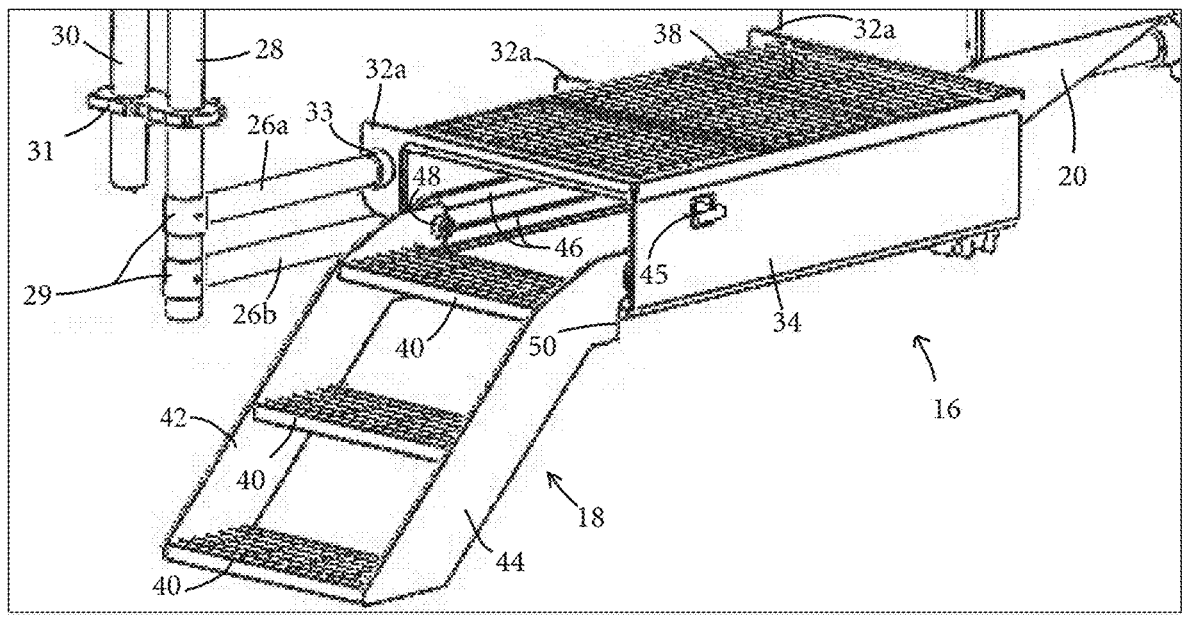
FIG. 5A is an enlarged left-rear perspective view of a deployable platform portion of the vehicle mounted accessory of FIG. 1, depicted with a stair frame in a deployed configuration.
Figure 5B:
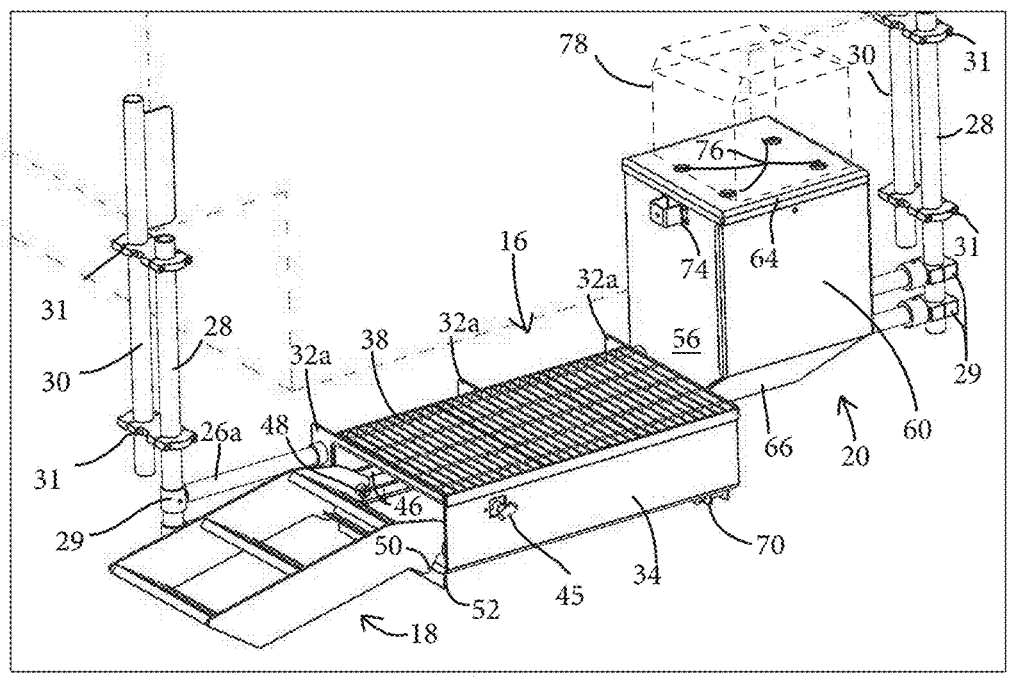
FIG. 5B is an enlarged perspective view of the vehicle mounted accessory of FIG. 5A, depicted with the stair frame in a raised-extended configuration.
Figure 5C:
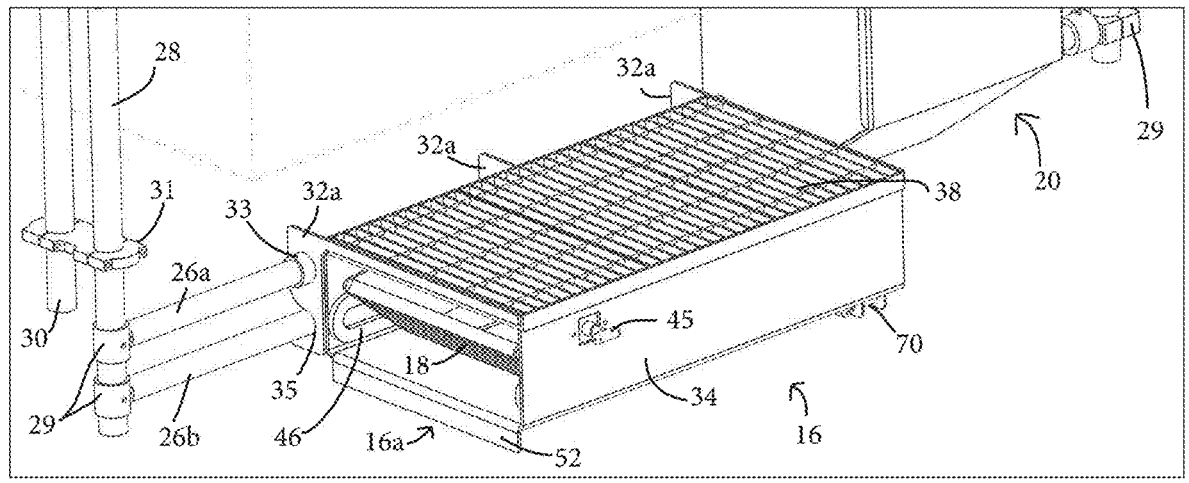
FIG. 5C is an enlarged perspective view of the vehicle mounted accessory FIG. 5A, depicted with the stair frame in a stowed configuration.

As shown in FIGS. 3, 5A and 5C, mounting plates 32a are fixed to the exterior side of the inward sidewall 32 and pivotably disposed on the upper rail 26a at a hole through the plate 32a. The mounting plates 32a are rotatable around the upper rail 26a to allow the access platform to pivot between the stowed and deployed configurations. Further, the mounting plates 32a are slideable along the upper rail 26a to allow a user to slide the access platform 16 along the support rack 26 to a desired lateral or side-to-side position on the rack 26. Guide collars 33 (FIG. 5A) are disposed on the mounting plates 32a to reduce pressure and wear between the upper rail 26a and the plate 32a, which thereby increases pivotability and slidability of the access platform 16 about the upper rail 26a. The mounting plates 32a each include a stop or rest defined by a notch or cutout 35 in the plate 32a and located proximate the lower rail 26b when the access platform 16 is in the deployed configuration of FIGS.

3, 5A, 5B, and 5C. When the access platform 16 is in the deployed configuration the stop 35 abuts the lower rail 26b (FIG. 5C). The shape and depth of the stop 35 is determined based on a function of the spacing and relative location between rails 26a, 26b and the spacing and relative location of the hole through the mounting plate 32a, such that when the stop 35 is abutting the lower rail 26b, the top platform 38 of the access platform 16 is substantially parallel to the bed of the vehicle 12.

The deployable stair frame 18 is operable to nest or stow inside of the frame of the access platform 16. The stair frame 18 is slideably deployable from a nested or stowed configuration inside of the access platform 16 (FIGS. 5C and 5D) to an extended configuration wherein the stair frame 18 is substantially extended out from the receiving end 16a while remaining in generally the same orientation as when it is in the stowed configuration (FIG. 5B; shown in phantom in FIG. 2B). The stair frame 18 is pivotable from the extended configuration to a deployed configuration wherein the stair frame 18 is oriented at an oblique angle relative to the frame of the access platform 16 (FIGS. 1, 2A and 5A). In the deployed configuration the stair frame 18 provides access from the ground, or other surface proximate the vehicle 12, to the access platform 16. Optionally, one or more hand rails or railings may be provided along the stair frame 18 and/or the platform 16.

The deployable stair frame 18 includes an inward stringer 42 positioned proximate the inward sidewall 32, an outward stringer 44 positioned proximate the outward sidewall 34, and at least one stair tread 40 fixedly disposed perpendicularly between the inward stringer 42 and the outward stringer 44 (FIG. 5A). The stair tread 40 may include grating, treading, or grip tape to increase friction and provide safety for a user or operator traversing the stair tread 40. A latch or locking mechanism 45 (FIGS. 5A-5D) may be included to latch or lock the stair frame 18 inside the access platform 16 when the stair frame 18 is in the nested configuration to secure the stair frame 18 for transport and/or safety purposes. The latch 45 may be a spring pin latch or any suitable retaining mechanism.

As best shown in FIGS. 5A-5B, a guide channel 46 is disposed on respective interior sides of the inward sidewall 32 and the outward sidewall 34. A substantially similar guide channel is discussed below in reference to the illustrated embodiments of FIGS. 6-15A. A guide pin 48 is disposed at a respective proximal end of each of the stringers 42, 44. The guide pins 48 support the stair frame 18 within the guide channels 46 inside the access platform 16. The guide pins 48 are slideable within their respective guide channels 46 to guide the stair frame 18 between the nested configuration and the extended configuration during stowing and deploying of the stair frame 18. The guide pins 48 allow the stair frame 18 to pivot between the extended configuration (FIG. 5B) and the deployed configuration (FIG. 5A) during deployment and stowage of the stair frame 18, and the guide pins 48 may be rotatable within the guide channels 46 for this purpose. Each stringer 42, 44 includes a stop or rest 50 defined by a notch or cutout proximate the stringers proximal end 42a, 44a (FIG. 5A). When the stair frame 18 is in the deployed configuration the stop 50 abuts a bumper 52 disposed on the bottom 36 of the access platform 16 at the receiving end 16a (FIG. 5B). The location of the stop 50 on each stringer 42, 44 is determined based on a function of the length of the stringers 42, 44, the location of the guide pins 48 on the stringers, and the position of the end of the guide channels 46 relative to the receiving end 16a of the access platform 16, such that when the stop 50 is abutting the bumper 52, the treads 40 is substantially parallel to the top surface 38 of the access platform 16, even if the stringers 42, 44 are not contacting the ground.

Figure 4:
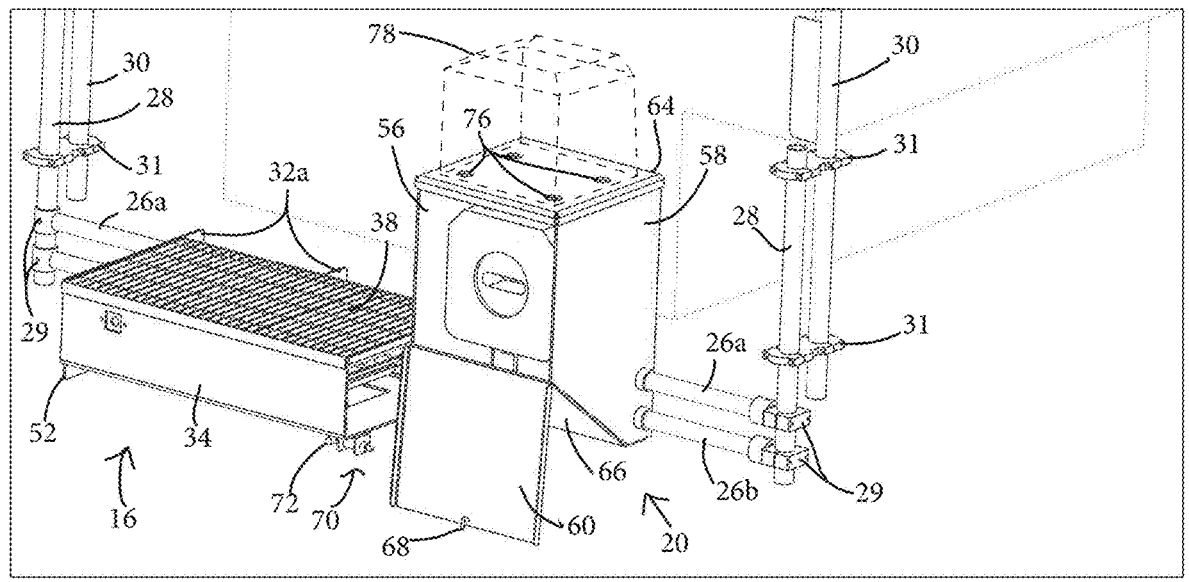
FIG. 4 is a right-rear perspective view of the vehicle mounted accessory of FIG. 1, in which an access door is shown in an open configuration.
Figure 5D:
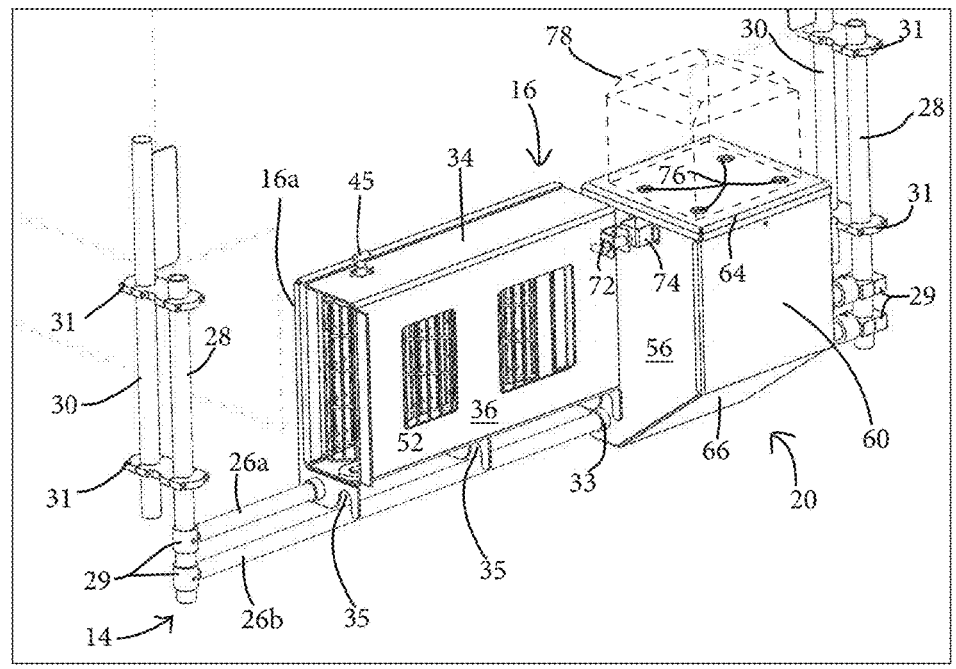
FIG. 5D is an enlarged perspective view of the vehicle mounted accessory of FIG. 5A, depicted with the access platform in a stowed configuration.

The accessory storage bin 20 is slideably mounted on the support rack 26 to allow a user to slide the storage bin 20 to a desired lateral or side-to-side position along the support rack 26 and adjacent to the access platform 16 (FIGS. 3 and 4). A set of guide collars 54 are mounted at through holes formed in the storage bin's left and right sidewalls 56, 58, and receive the support rails 26a, 26b to mount the storage bin 20 along the rails 26a, 26b. The collars 54 and corresponding holes are configured to slideably mount over the support rails 26a, 26b. The through-hole diameter is at least slightly larger than the outer diameter of the support rails. The storage bin 20 includes an access door 60 that is operable to open to access an interior space of the storage bin 20. The storage bin 20 includes a back panel 62, a top panel 64, and a bottom panel 66 that coordinate with the left sidewall 56, the right sidewall 58, and the access door 60 to define the interior space of the storage bin 20. The storage bin 20 includes a door latch or locking mechanism 68 disposed on the access door 60 to lock the storage bin 20. A platform latch or locking mechanism 70, including a latch pin 72, is disposed on a non-receiving end portion of the access platform 16 and a platform latch receiver 74 is disposed on a portion of the left sidewall 56 of the storage bin 16 (FIG. 5D). The platform latch 70 and latch receiver 74 are disposed on their respective structures such that when the access platform 16 is in the stowed configuration, platform latch 70 and latch receiver 74 are aligned so that the latch pin 72 can enter into the latch receiver 74 to secure the access platform 16 in the stowed configuration for transport. The door latch 68 and platform latch 70 may each be a spring pin latch or other suitable latch or retaining mechanism.

The storage bin 20 is sized and shaped to store and support various equipment, tools, fuel tanks, or other accessories within the interior space of the storage bin 20. The top panel 64 may provide structural support for a piece of functional equipment, accessory, or tool, as represented by a phantom rectangle in FIGS. 4, 5B, and 5D. As illustrated in FIGS. 3, 4 and 5D, the top panel 64 includes recesses and/or holes 76 disposed on the top surface of the panel 64 or extending fully through the panel 64. The recesses or holes 76 are configured in spaced arrangement to receive feet, isolators, or supports of a piece of functional equipment 78, such as a gas powered electricity generator. The feet of the generator can be inserted into the recesses or holes 76 and can be bolted or secured through the top panel 64 to fix the generator to the storage bin 20. Because the bolts securing the generator to the top panel 64 pass through the top panel 64 and are accessed from inside the storage bin 20 where threaded nuts or similar fasteners may be used to secure the bolts, the generator is effectively locked and secured from theft when the storage bin 20 is locked. The generator may be used to supply electricity to the truck mounted camper 22, the vehicle 12, or to substantially any other desired electrical device.

Figure 7:
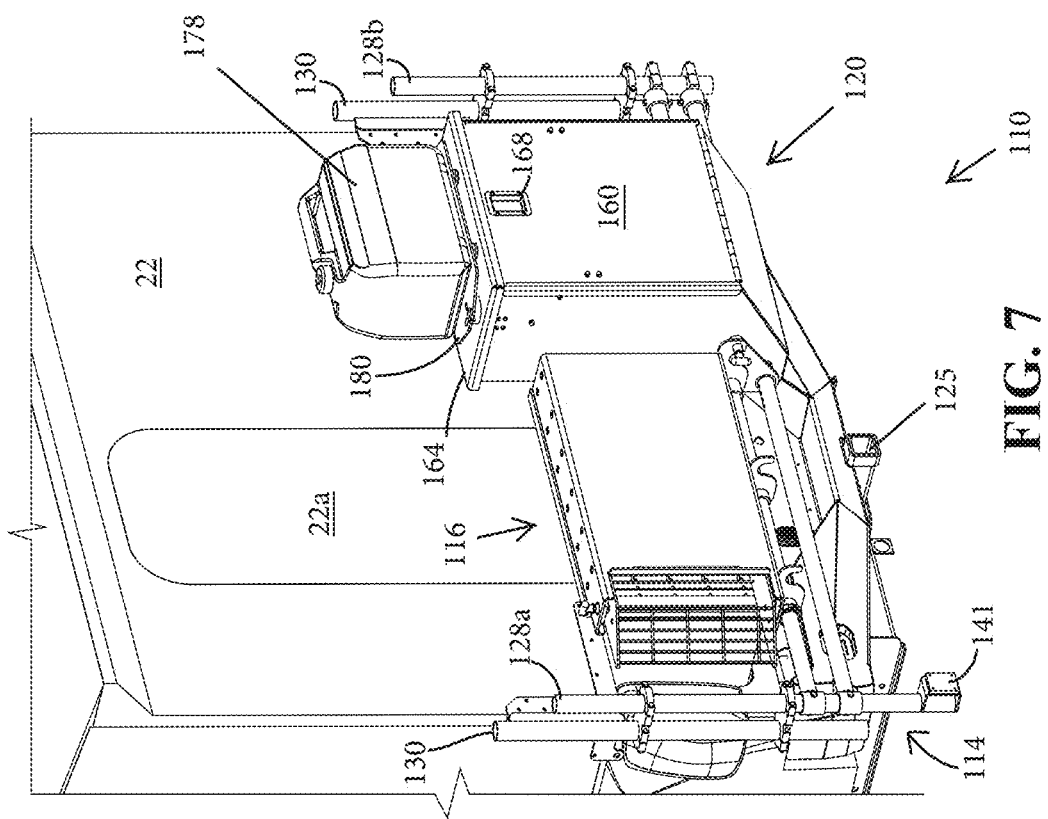
FIG. 7 is another left-rear perspective view of the vehicle mounted accessory of FIG. 6, depicted with the access platform portion stowed.
Figure 6:
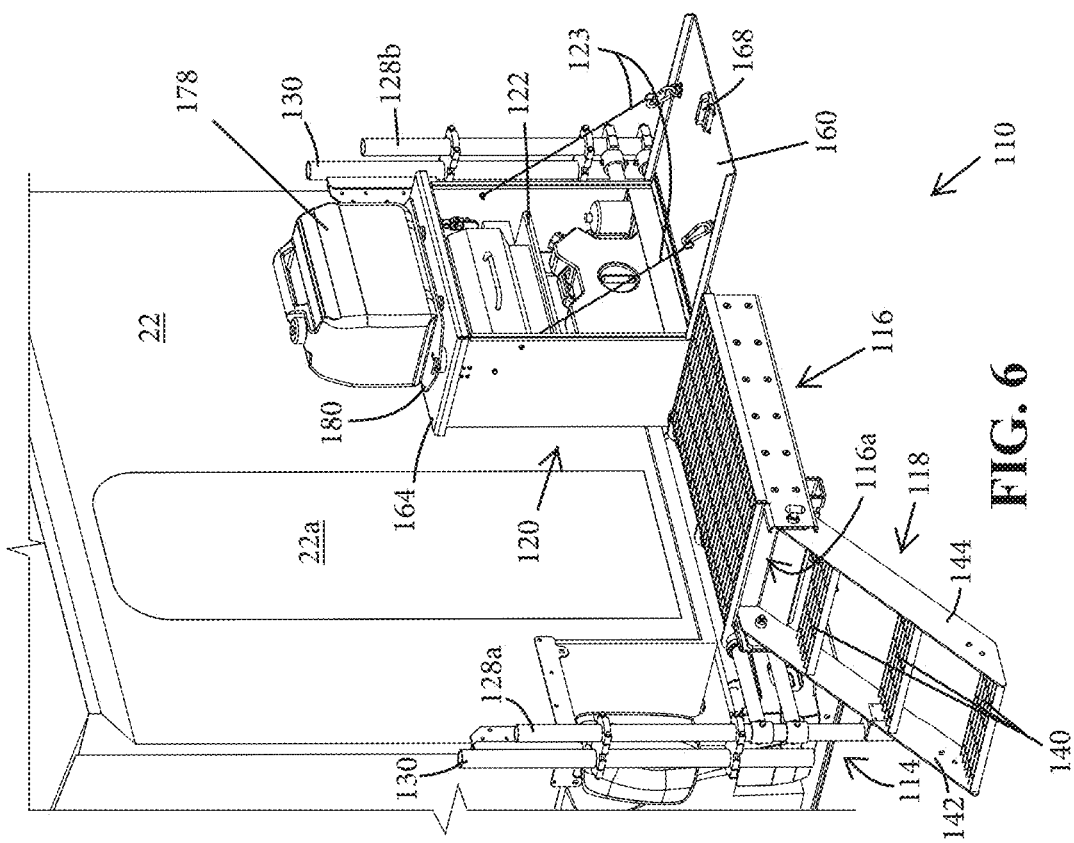
FIG. 6 is a left-rear perspective view of another vehicle mounted accessory in accordance with an embodiment of the present invention, depicted with the access platform portion deployed.

Referring to the illustrative embodiments of FIGS. 6-16A, another vehicle mounted accessory 110 is provided. The accessory 110 is configured similarly and functions in similar fashion to accessory 10 described above, and includes many identical or substantially similar components, with significant differences discussed hereinafter. The accessory 110 includes support frame 114 and a deployable access platform 116 that is movable between a stowed platform configuration (FIG. 7) to a deployed platform configuration (FIG. 6). For reference purposes, substantially similar or identical structures and components of accessory 110 as compared to accessory 10 are labeled with the same label number appended with the addition of 100, e.g. the support frame 114 is substantially similar to support frame 14 and platform 116 is substantially similar to and operates in similar fashion to platform 16 of accessory 10 described above. Accessory 110 includes a storage unit or cabinet 120 similar to storage unit 20 of accessory 10, however storage unit 120 includes an elevated storage shelf 122 inside the accessible interior of the unit 120, a pair of access panel retaining lanyards or cables 123 to support a front access panel 160 when the panel 160 is open, and an accessory coupling platform 180 that is supported at an upper panel 164 of the unit 120 and is selectively removable from the storage unit 120 (FIGS. 6-7). The accessory coupling platform 180 is provided for securing a functional accessory, such as an electricity generator 178, to the storage unit 120 while allowing a user to quickly and easily remove the generator 178 from the unit 120 when desired.

As best illustrated in FIGS. 13-15, the accessory coupling platform 180 is defined by a plate that is about equal in size as the footprint of the generator 178. However, it will be appreciated that the accessory coupling platform 180 may be various shapes and sizes, as desired or required to support the functional accessory. The platform 180 is releasably and removably coupled to the upper panel 164 by a pair of toggle clamps or folding latches 182 coupled to respective side walls 156 and 158 of the storage unit 120 and protruding through a portion of the upper panel 164. Each toggle clamp 182 includes a draw arm 184 that protrudes through an opening in the upper panel 164 (FIG. 14B). The draw arm 184 includes a hook or gripping portion 184a that selectively engages the platform 180 when the clamp 182 is closed or latched. The upper portion of the draw arm 184 and hook 184a extend through a slot or opening at a side end of the platform 180 such that the draw arm 184 can disengage the platform 180 to allow the platform 180 to be removed from the storage unit 120. When the platform 180 is present and properly positioned on the upper panel 164, the draw arm 184 is insertable into the slot at the side of the platform 180 to allow the hook 184a to engage a portion of the platform 180 proximate the slot. A latch handle 186 is provided to actuate the toggle clamp 182 to selectively engage the draw arm 184 and hook 184a with the platform 180. The toggle clamp 182 may be any number of typical clamps known in the art, or may be substituted with any suitable alternative latch, clamp, or like securing device. Isolators or pads 188 are provided between the accessory platform 180 and the upper panel 164 to reduce or eliminate vibration transfer from the platform to the upper panel 164, such as vibrations experienced during operation of the generator 178. The generator 178 may be fixedly secured to the accessory platform 180 with mechanical fasteners, such as with bolts and nuts. The toggle clamps 182 are positioned such that the latch handles 186 are only accessible from the interior of the storage unit 120 and may be lockable in a manner such that the generator 178 is secured from theft when the storage unit 120 is locked and the interior of the unit 120 is inaccessible.

The storage unit 120 includes the elevated shelf 122, a lower shelf 125, and a propane bottle rack 127 (FIG. 14). The storage unit 120 is configured to store various types of equipment, such as tools, electricity generators, food grills 137, fuel tanks (such as gas tanks 135), water tanks, animal tack, or the like. The propane bottle rack 127 is configured to retain and organize propane tanks 139, such as the type used for portable food grills. The lanyards 123 may be sized to retain the access panel 160 at a desired orientation relative to the storage unit 120 when the panel 160 is in the open position. For example, the lanyards 123 may retain the access panel 160 substantially horizontal such that the panel 160 may be utilized as a shelf or workstation, such as for supporting the food grill when the user is cooking food, or as a counter space to prepare food, etc. (FIG. 6). The storage unit 120 includes a door latch or locking mechanism 168 disposed on the access door 160 to lock the storage unit 120 (FIGS. 6-8 and 15). As best shown in FIGS. 11 and 11A, a storage unit coupling bracket 161 provided for coupling the storage unit 120 to the truck camper 22. The bracket 161 is coupled to the storage unit 120 and truck camper 22 with mechanical fasteners in the form of bolts and nuts, however, it will be appreciated that the bracket 161 may be attached to either the storage unit 120 or the camper 22 with other forms of mechanicals fasteners or by welds.

Figure 8:
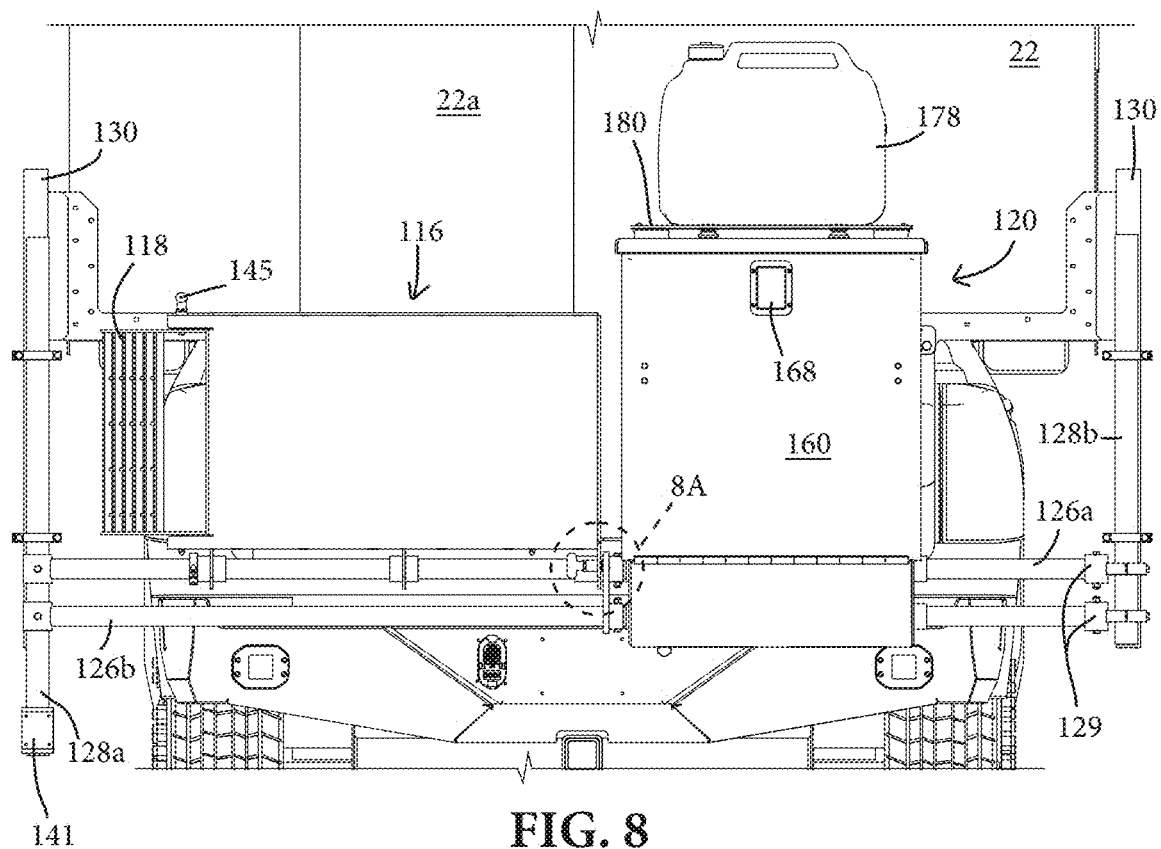
FIG. 8 is a rear elevation view of the vehicle mounted accessory of FIG. 7.
Figure 8A:
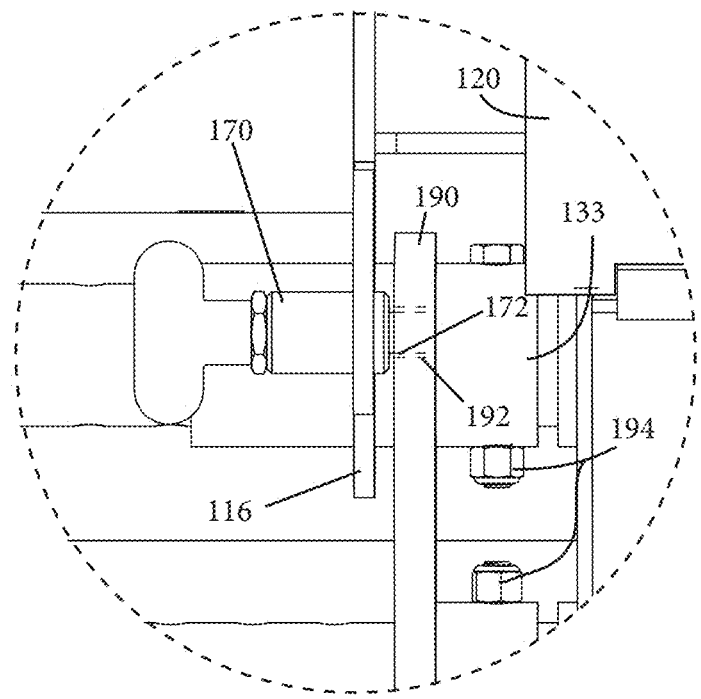
FIG. 8A is an enlarged view of the region designated 8A in FIG. 8.

The access platform 116 is configured substantially similar to access platform 16 of accessory 10 and includes a frame having a hollow or open interior (FIGS. 6-7, 9, 12A-12C, and 16). The platform 116 is pivotably and slideably coupled to the support frame 114 at the upper rail 126a by mounting plates 132a, and the access platform 116a operates in substantially similar fashion as access platform 16 of accessory 10, as detailed above. A weldment or securing plate 190 is provide with accessory 110 (FIGS. 16 and 16A). The plate 190 is coupled to the upper rail 126a and lower rail 126b at holes through the plate 190. The plate 190 cooperates with a platform latch or locking mechanism 170 to lock or secure the access platform 116 in the stowed configuration (FIGS. 7-8A). The locking mechanism 170 may be similar to mechanism 70 of accessory 10. The locking mechanism 170 includes a latch pin 72, which may be spring-loaded, that is selectively operable to extend into and engage a pin hole 192 defined through the securing plate 190. The securing plate includes guide collars 133 to reduce friction between the securing plate 190 and the rails 126a and 126b (FIGS. 15 and 15A). Mechanical fasteners 194 such as nuts and bolts are provided for fixing the securing plate 190 relative to the rails 126a and 126b. A plurality of holes 196 are provided along the rails 126a and 126b to allow for side-to-side adjustment of the securing plate 190 relative to the rails. Optionally, mounting plates 132a may include pin holes corresponding to holes 196 to allow for fixedly securing and supporting the access platform 116 relative to the rails 126a and 126b, such as with mechanical fasteners.

The accessory 110 includes a deployable stair frame 118 that is nestable within the access platform 116, through an opening 116a at a left end of the frame of the access platform 116 (FIGS. 6, 10, and 12A-12C). The stair frame 118 moves between a stowed stair configuration to a deployed stair configuration in a substantially similar fashion to that of stair frame 18 of accessory 10, as detailed above. As best shown in FIGS. 10 and 12A-12C, the access platform includes a guide channel 146 disposed on interior portions of each of the respective side walls 132 and 134 of the platform 116. The guide channel 146 is substantially similar to channel 46 of accessory 10 and is configured to receive and guide a guide pin 148 of the deployable stair frame 118. The deployable stair frame 118 is substantially similar to the stair frame 18, however the stair frame 118 does not include stops or rests (like the stops 50 described above) on the stringers 142, 144 that each abut a bumper on the bottom 136 of the access platform 116 when the stair frame 118 is in a fully deployed stair configuration. Alternative to that of stair frame 18 and platform 16, stair frame 118 includes a stop or rest plate 151 that extends between the stringers 142 and 144

Figure 12A:
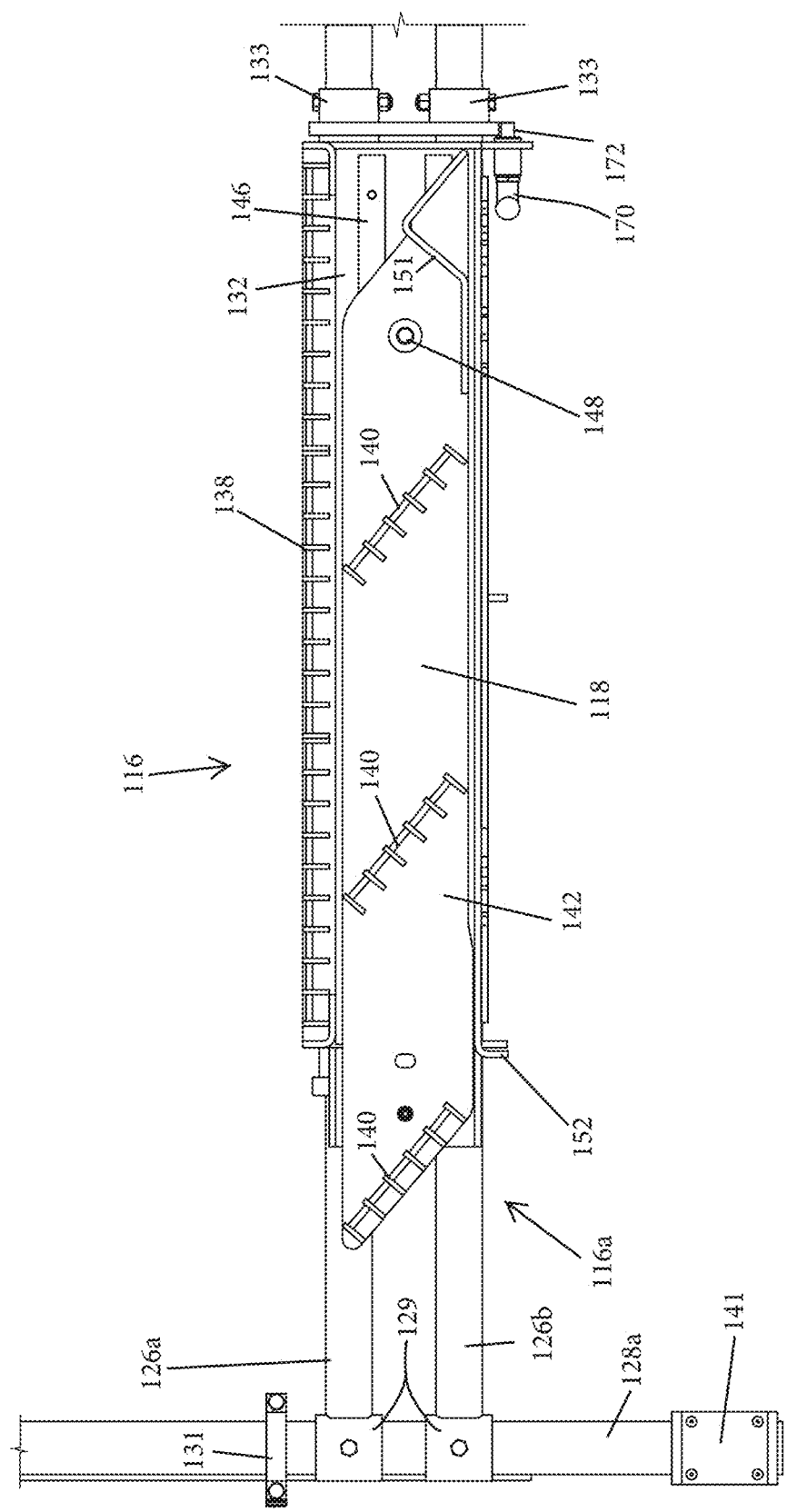
FIG. 12A is a sectional rear elevation view of the vehicle mounted accessory taken along Line XIIA-XIIA in FIG. 9, depicted with the deployable stair in a stowed position.
Figure 12B:
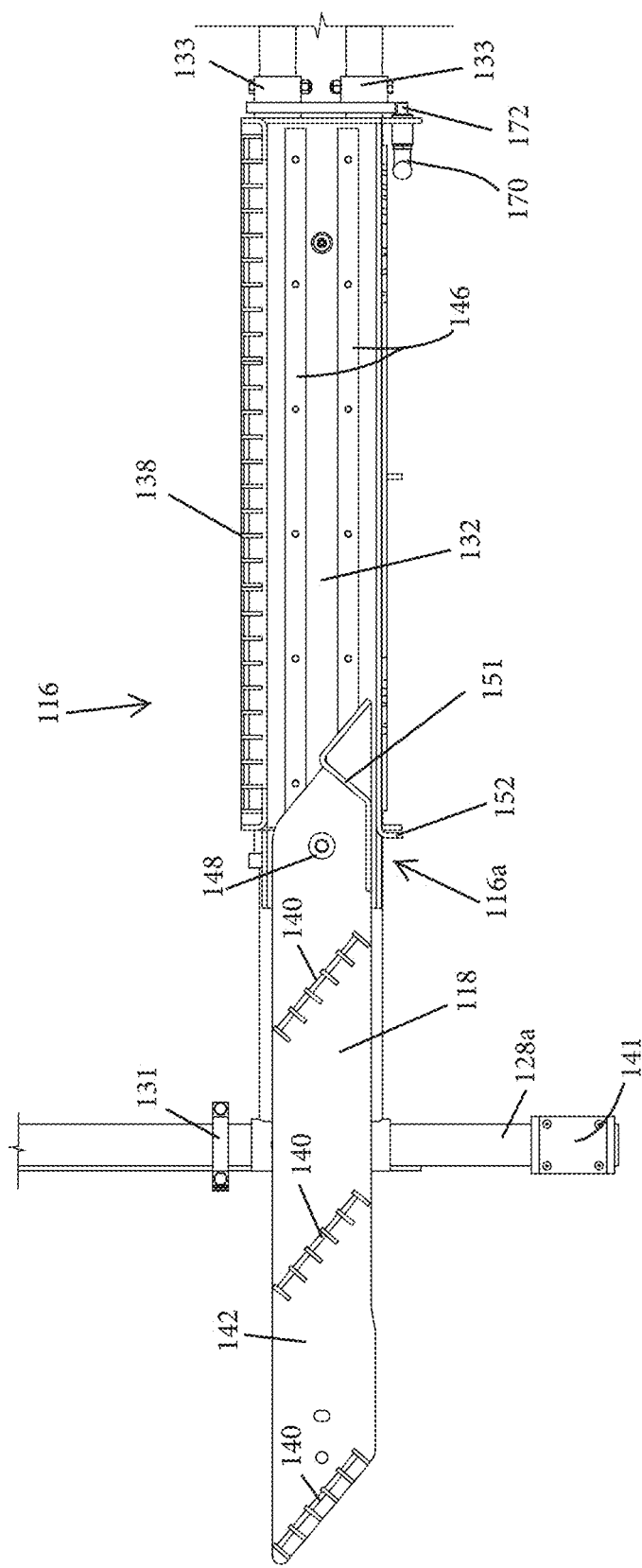
FIG. 12B is a sectional rear elevation view of the vehicle mounted accessory of FIG. 12A, depicted with the deployable stair in a partially deployed position.
Figure 12C:
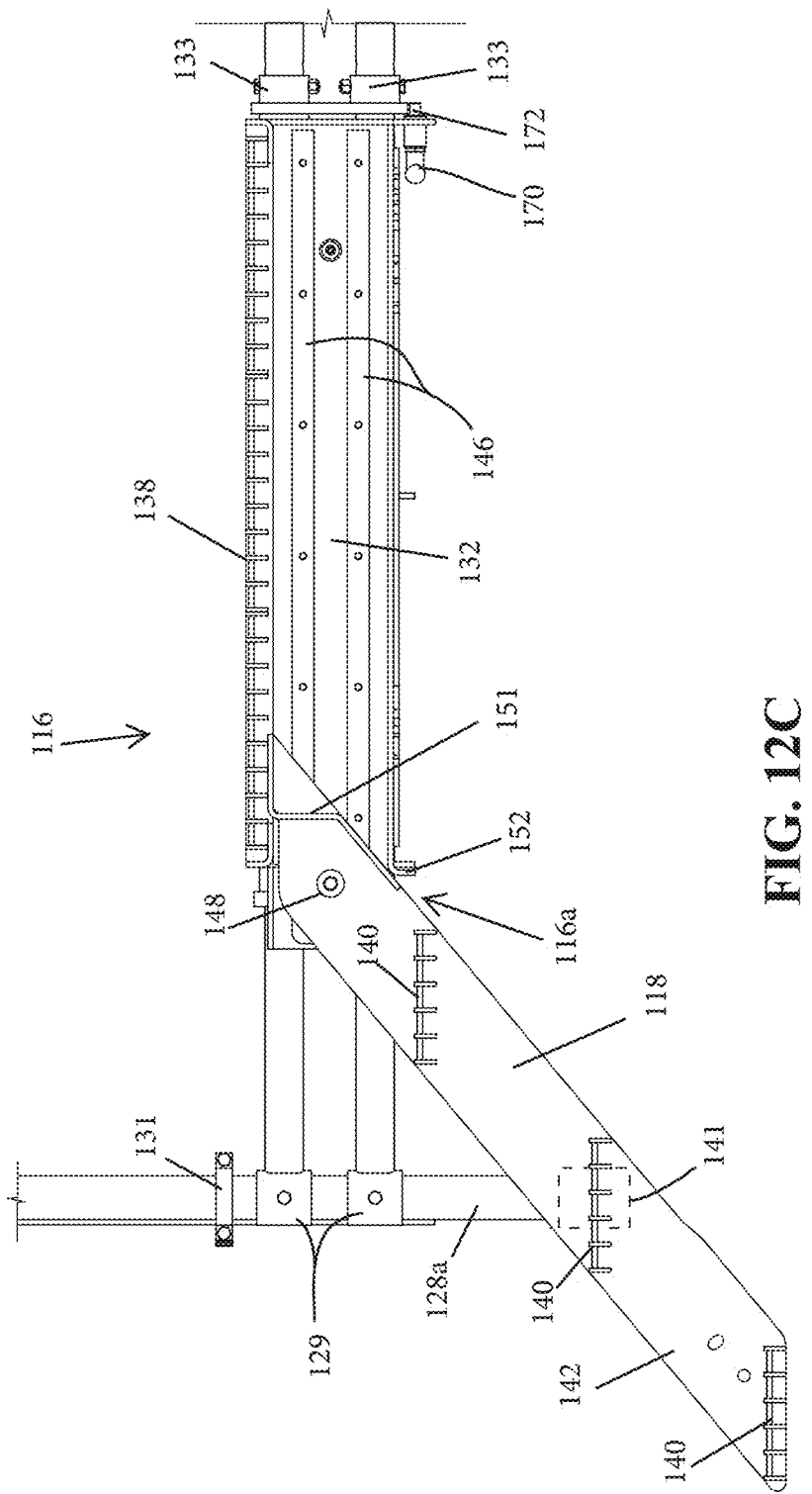
FIG. 12C is a sectional rear elevation view of the vehicle mounted accessory of FIG. 12A, depicted with the deployable stair in a fully deployed position.

(FIGS. 12A-12C). In the fully deployed stair configuration, an upper portion of the plate 151 abuts an underside of the top platform 138 of the access platform 116, and a lower portion of the plate 151 abuts the end portion of the bottom 136, such as at a bumper 152 disposed at the left end of the bottom 136 (FIG. 12C).

The guide pins 148, guide channels 146, and stair frame 118 operate and move in substantially similar fashion to that of pins 48, channels 46, and stair frame 18 of accessory 10 when the stair frame is deploying and nesting relative to the access platform 116. The access platform 116 includes a latch or locking mechanism 145 substantially similar to that of latch mechanism 45 of accessory 10, as detailed above, to secure or lock the deployable stair frame 118 in the nested configuration relative to the access platform 116 (FIGS. 8 and 16). The latch mechanism 145 is located somewhat nearer to the opening end 116a of the access platform 116 as compared to mechanism 45 and platform 16. The locking mechanism 145 may similar in structure and function as mechanism 45 of accessory 10, as described above.

The support frame 114 includes a stair support 141 that is disposed on a lower portion of the left-side vertical support 128a (FIGS. 7, 8, and 12A-12B). The left-side vertical support 128a is longer than the right-side vertical support 128b, such that a portion of the left-side support 128a extends further below the lower rail 126b than does the right-side support 128b. The stair support 141 is coupled to the lower end of the left-side support 128a and positioned proximate the inward stringer 142 when the deployable stair 118 is in the fully deployed stair configuration (see FIG. 6, the stair support 141 is shown in phantom in FIG. 12C). The stair support 141 extends between vertical support 128a and the inward stringer 142 to support the deployable stair 118 laterally when a user places their weight on the deployable stair 118. The stair support 141 stops or impedes the deployable stair 118 from rocking or shifting toward the vehicle. The stair support 141 may include a magnet or other form of coupling or retaining device, such as a cradle bracket that cradles a portion of the inward stringer 142, to retain the inward stringer 142 adjacent to the stair support 141 when the deployable stair is in the fully deployed stair configuration.

Figure 17:
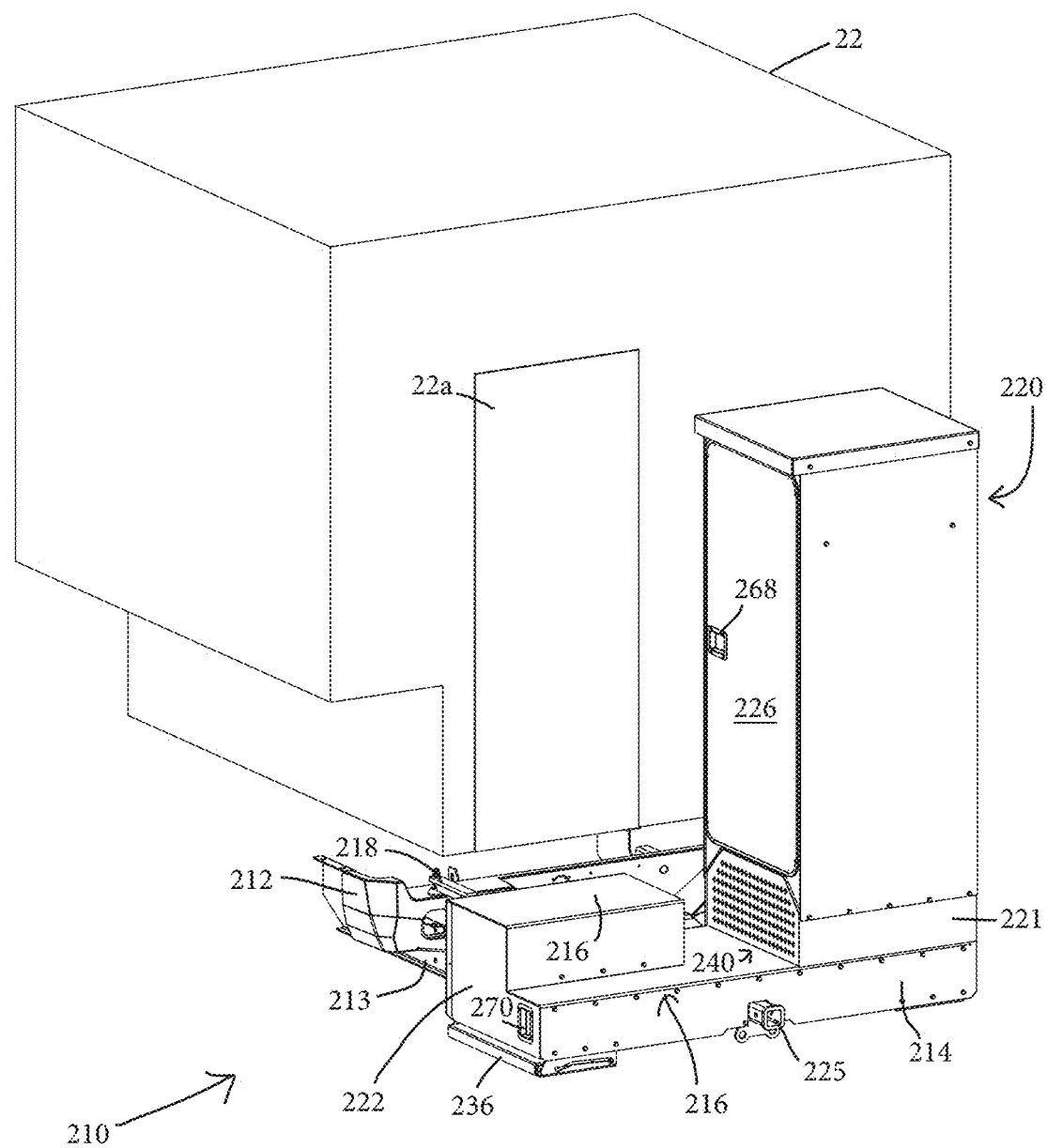
FIG. 17 is a left-rear perspective view of another vehicle mounted accessory in accordance with an embodiment of the present invention, shown mounted at a vehicle bumper and disposed behind a camper unit as would be mounted in the bed of a truck.

Referring to the illustrative embodiments of FIGS. 17-22, another vehicle mounted accessory 210 for mounting to a vehicle (partially depicted as a vehicle bumper 212 and vehicle frame 213 in FIG. 17) includes a support frame 214 and an access platform or "porch" 216 disposed proximate a side or rear of the vehicle to provide an exterior access platform or standing area proximate the vehicle. Similar to vehicle mounted accessories 10 and 110 depicted in FIGS. 1-16A, the accessory 210 includes a vehicle hitch receiver mount 219 to removably couple the accessory 210 to the hitch receiver of the vehicle. The vehicle mounted accessory 210 includes a hitch receiver extension 225 (FIGS. 16-18) similar to that of accessories 10 and 110 described above. The platform 216 includes a step 216a to provide improved access for a user accessing the vehicle, such as to access a camper unit 22 mounted on the vehicle. Alternatively, the platform may be substantially flat to provide a desired level of access for a user. The accessory 210 includes a plurality of mount stabilizer units or supports 218 that engage frame portions or mounting points of the vehicle to stabilize the accessory 210 and reduce or prevent tilting, pivoting, or rocking relative to the receiver mount 219 or vehicle.

Figure 18A:
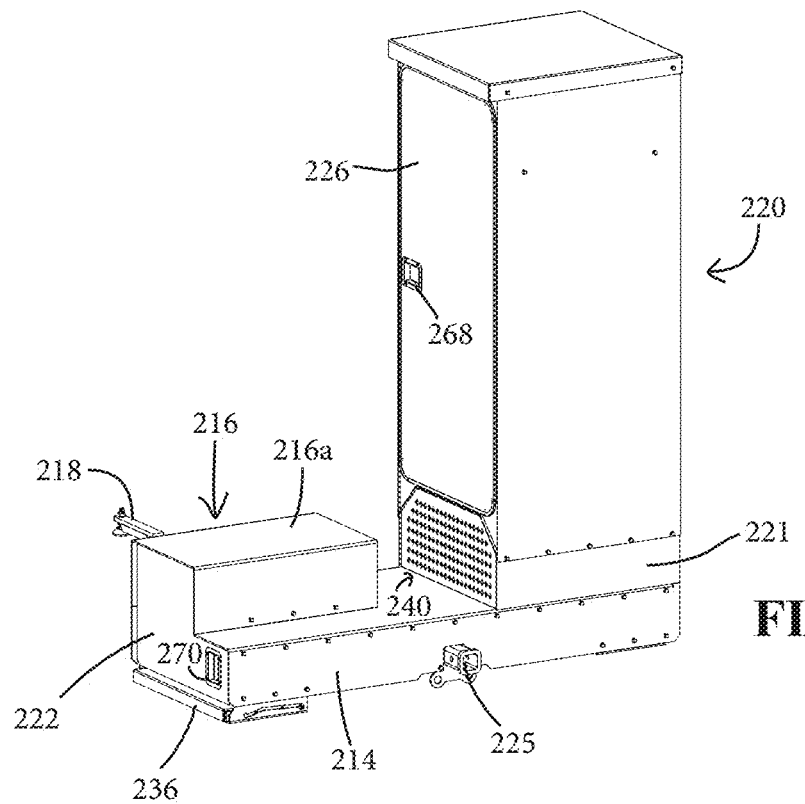
FIGS. 18A-18C are left-rear perspective views of the vehicle mounted accessory of FIG. 17, depicting sequential deployment of a deployable step and various accessible storage units.
Figure 18B:
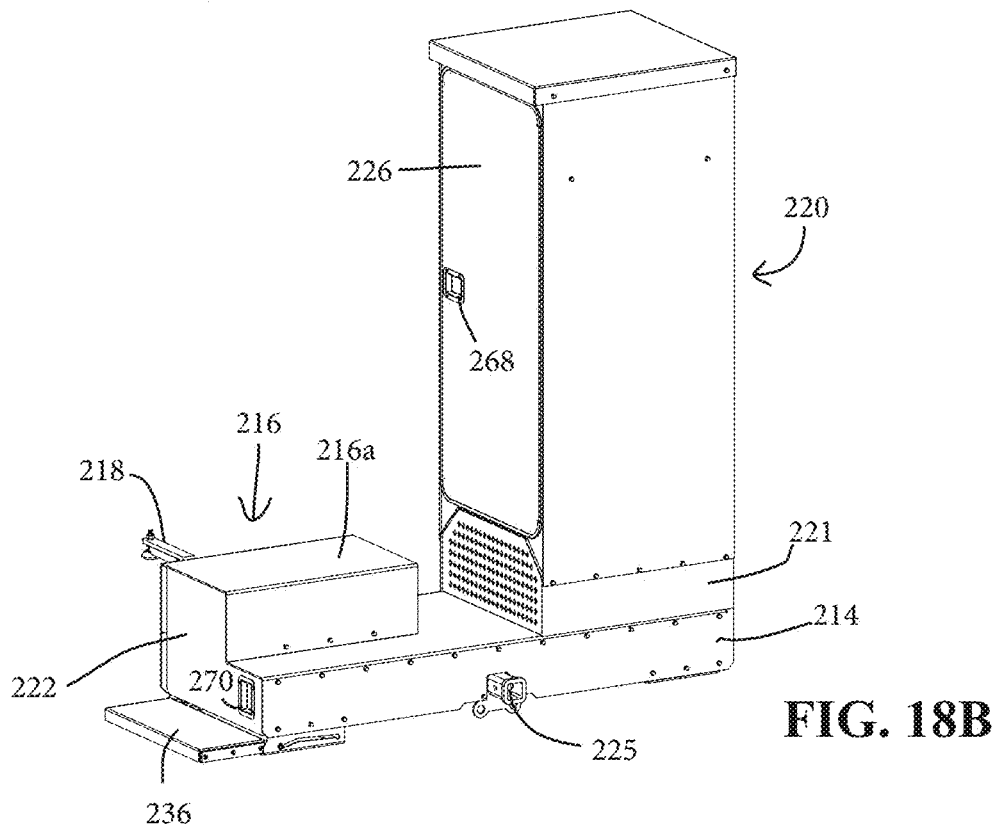
Figure 18C:
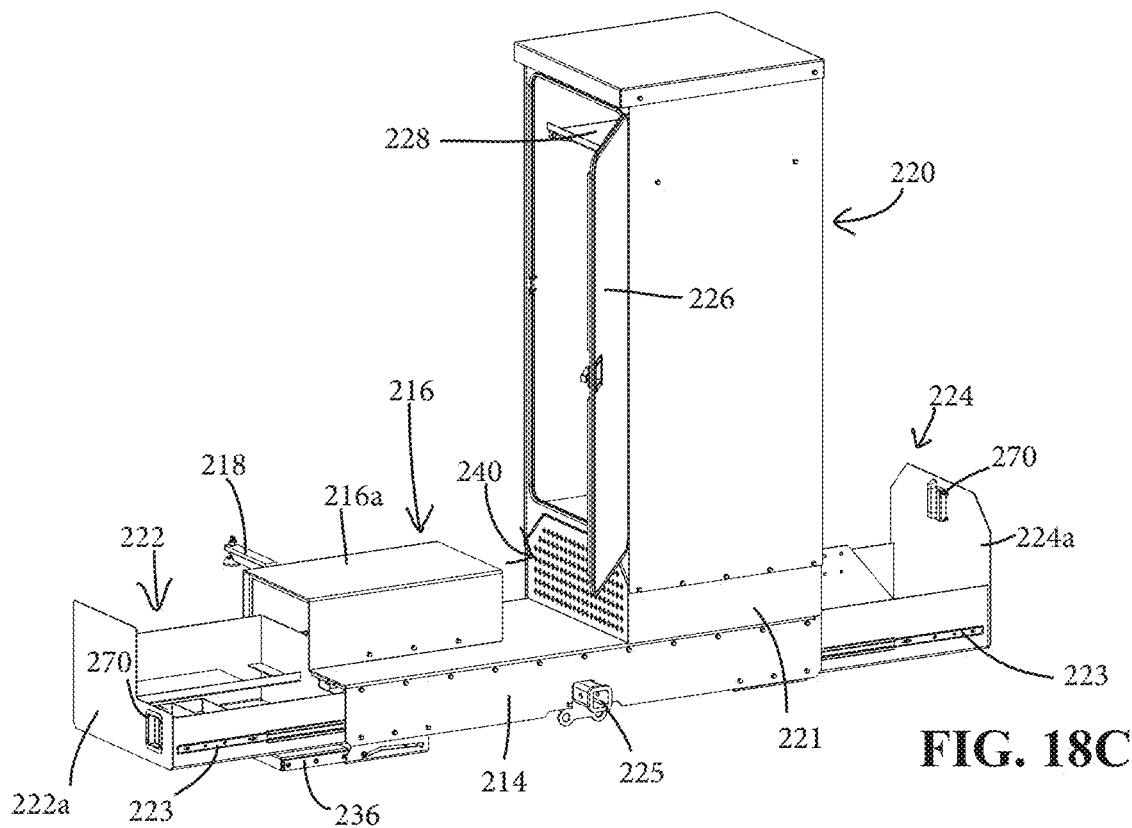
Figure 19:
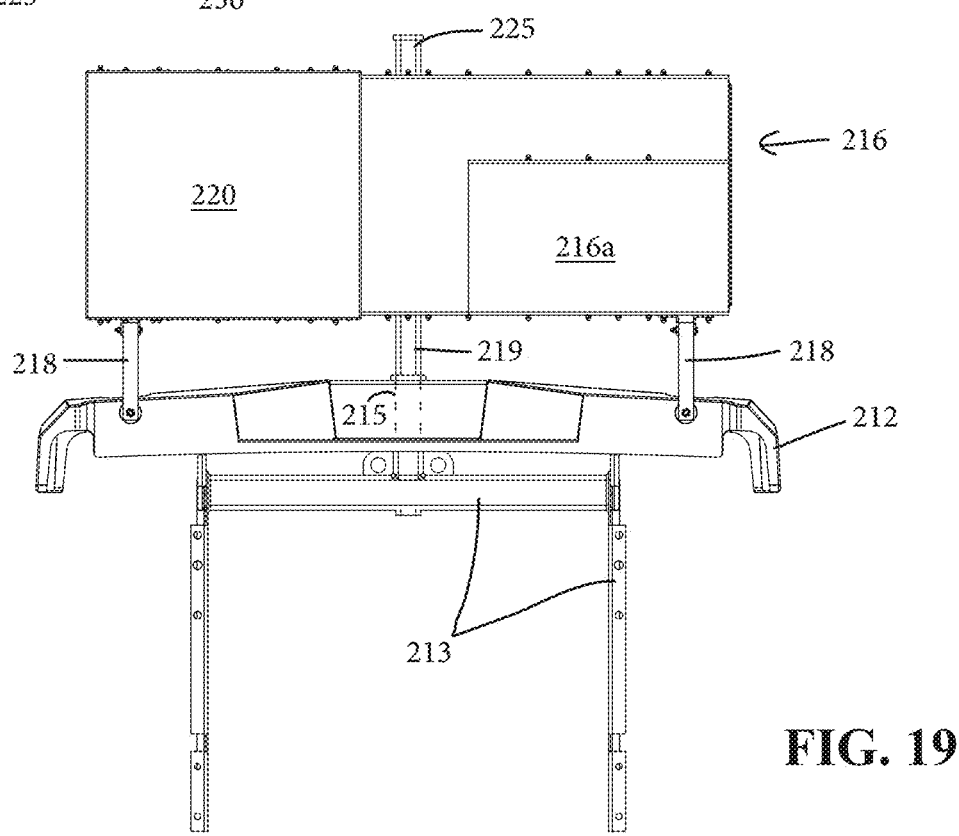
FIG. 19 is a top plan view of the vehicle mounted accessory of FIG. 17.
Figure 20:
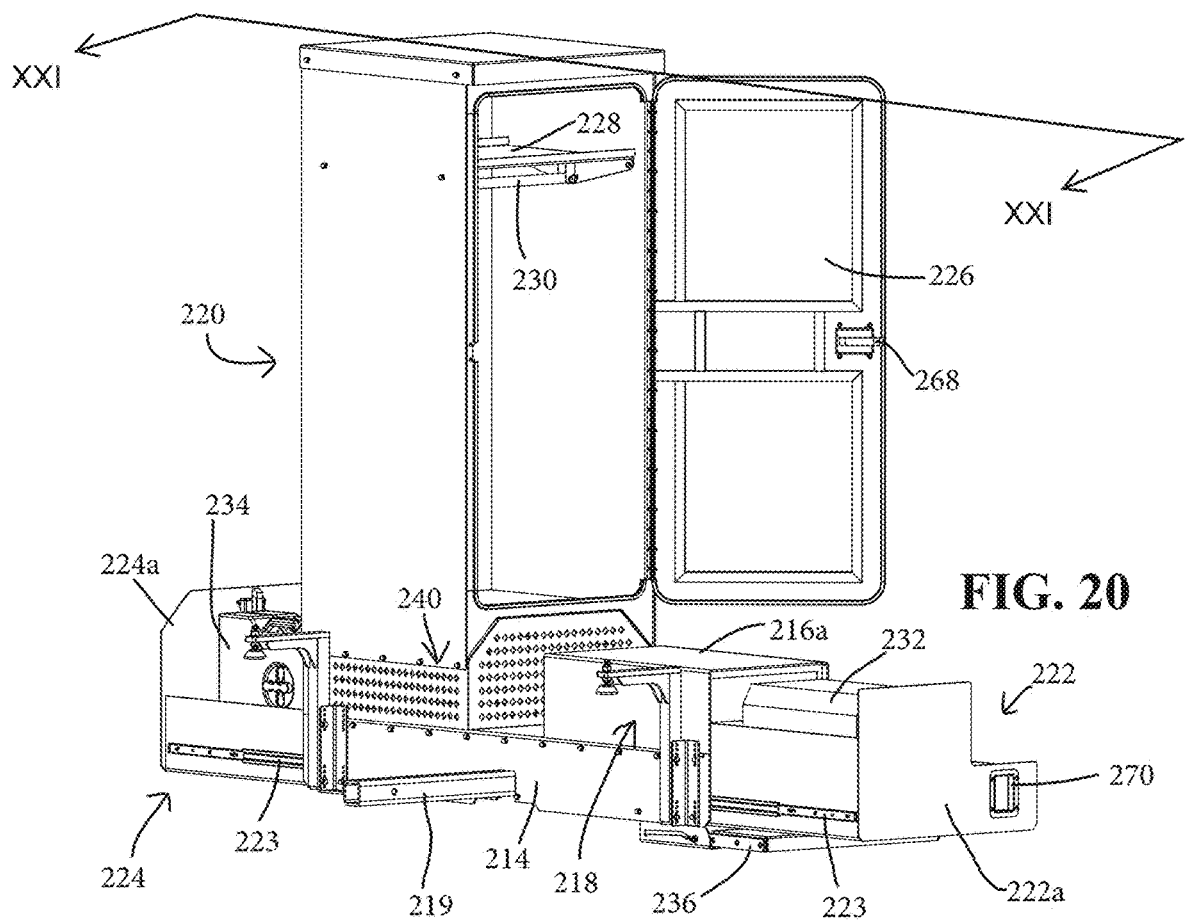
FIG. 20 is a left-front perspective view of the vehicle mounted accessory of FIG. 17, depicted with the deployable step and various storage units deployed.
Figure 21:
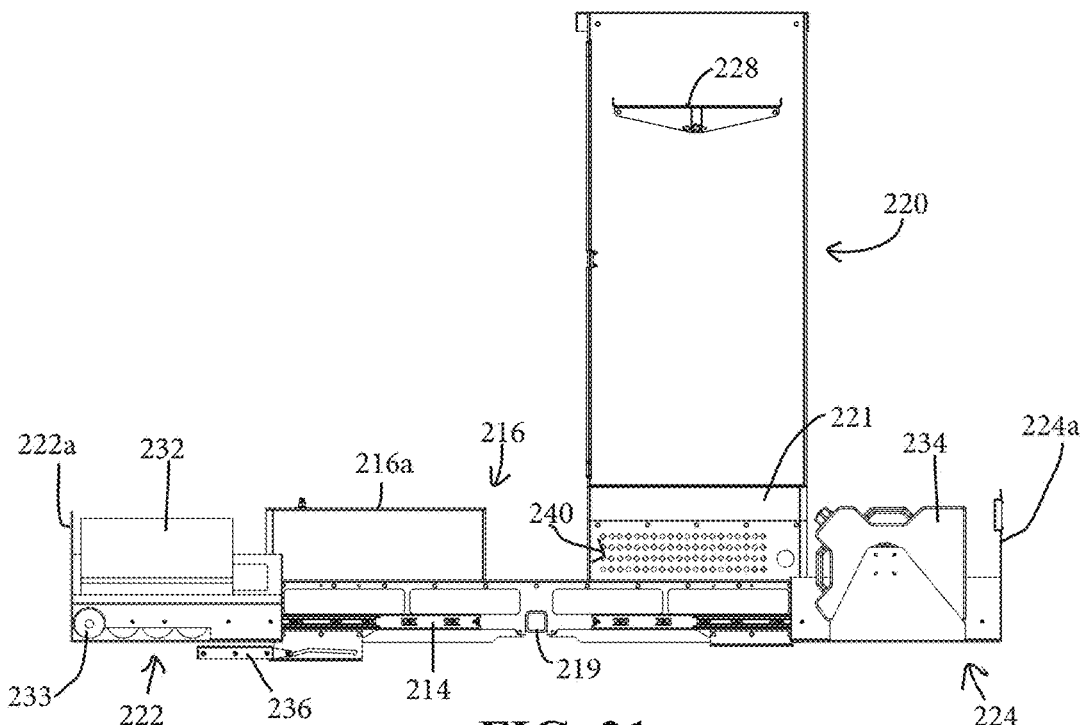
FIG. 21 is a sectional rear elevation view of the vehicle mounted accessory taken along Line XXI-XXI in FIG. 20.

The vehicle mounted accessory 210 includes a storage unit or closet 220, a left-side storage unit or drawer 222 (when viewing the accessory 210 from the rear of the vehicle), and a right-side storage unit or drawer 224 (when viewing the accessory 210 from the rear of the vehicle), which are depicted in their respective deployed positions in FIGS. 18C and 20-21. While the closet 220 and drawers 222, 224 are not adjustably attached to the support frame 214 in the illustrated embodiment, it will be appreciated that they may optionally be adjustably mounted to the support frame 214 similar to the various components of vehicle mounted accessories 10 and 110 described previously above.

The storage closet 220 is mounted on top of an accessory storage bin 221, which may be similar to the accessory storage bin described above with vehicle mounted accessory 10. The storage closet 220 includes an access door 226 to access the interior of the closet 220 (FIGS. 17-18C). The storage closet 220 includes a door latch or locking mechanism 268 disposed on the access door 226 to lock the storage closet 220 (FIGS. 17-18B, 20, and 22). The storage closet 220 may be used to store various large and tall types of equipment or goods, such as yard-working tools, camping gear, clothing, hunting equipment, and the like. Optionally, a shelf 228 and a clothes hanging rod 230 may be disposed inside of the closet 220, such as shown in FIG. 20. The drawers 222 and 224 are configured to store various types of equipment, such as tools, electricity generators, food grills, fuel tanks (such as gas tanks or propane tanks), water tanks, animal tack, or the like. The drawers 222 and 224 are slideably deployable and stowable within respective ends of the platform 216 of the vehicle mounted accessory 210. Sliding drawer mounts 223 are provided to facilitate the sliding movement of the drawers 222 and 224 relative to the support frame 214, such as shown in FIGS. 18C and 20.

Each drawer 222 and 224 includes a respective front panel 222a and 224a as shown in FIG. 18C. The perimeters of the front panels 222a and 224a are dimensioned and configured to nest within the respective sides of the frame 214 (FIG. 20). The deployment sequence of the drawers 222 and 224 is depicted in FIGS. 18B and 18C showing the drawers 222 and 224 moving from their stowed positions to their deployed positions. Stowage of the drawers 222 and 224 is accomplished by reversing the sequence depicted between FIGS. 18B and 18C. A space below the access platform 216 and/or step 216a may define an interior storage space accessible via the left-side drawer 222. In the illustrated embodiment of FIGS. 20 and 21, the left-side drawer 222 is configured to store a food grill 232, such as a propane gas grill for preparing food, along with propane tanks 233. Optionally, the left-side drawer 222 may itself be configured as a cooking grill, with the outer panels of the drawer forming the grill's fire box. The right-side drawer 224a provides access to the interior of the storage bin 221 which is configured to store an electricity generator (FIGS. 20-21) and a fuel or water storage tank 234 (FIGS. 20-21). As illustrated in FIGS. 17-22, the accessory storage bin 221 may include perforations 240 disposed through the panels of the bin 221. The perforations 240 allow exhaust from the generator and/or fumes from the fuel storage tanks 234 to escape and vent out of the bin 221, in the circumstance that the generator is operated while stowed inside of the bin 221. The storage drawers 222 and 224 each include a drawer latch or locking mechanism 270 disposed on their respective front panels 222a, 224a to lock the drawers (FIGS. 17-18C, 20, and 22).

Figure 22:
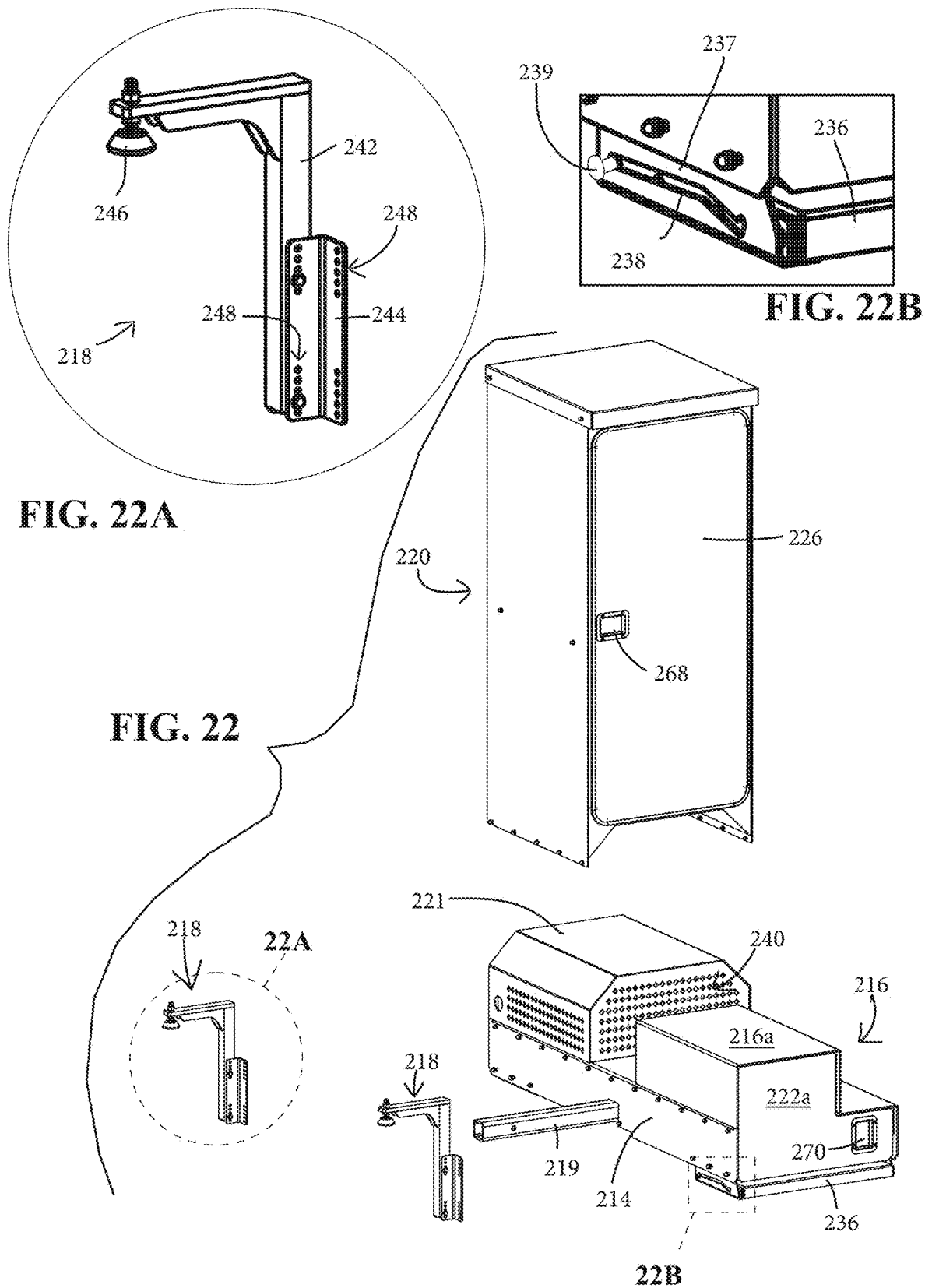
FIG. 22 is a partially exploded left-front perspective view of the vehicle mounted accessory of FIG. 17.

A deployable step or platform 236 is provided with the vehicle mounted accessory 210 (FIGS. 17-18C). As shown sequentially between FIGS. 18A and 18B, the step 236 is deployable from a stowed configuration (FIG. 18A) to an extended configuration (FIG. 18B). The step 236 provides improved access for a user to access or reach the platform 216 from the ground, or to reach the ground from the platform 216, thus facilitating user access between the camper unit 22 and the ground (FIG. 17). The step 236 is slideably mounted at each side to a mounting bracket 237 (FIG. 22B). The mounting bracket 237 includes a guide channel 238 defined by a slot formed through the mounting bracket 237. A guide pin 239 is fixed to each side of the step 236 and disposed through the respective channels 238. The guide pins 239 support the step 236 within the guide channels 238 and is slideable within the guide channels 238 to guide the step 236 between the stowed configuration and the extended configuration during stowage and deployment. While the step 236 shown in FIGS. 17-18C, 20-22, and 22B deploys only substantially horizontally, optionally the step 236 may deploy both horizontally and vertically similar to the stair frame 18 described above and shown in FIGS. 5A-5C.

The mount stabilizers 218 each include a frame 242, an adjustable mounting bracket 244, and an adjustable level mount or stand-off 246 (FIG. 22A). The level mount 246 may include a swivel stud (as commonly known for commercially available level mounts), allowing the contact end of the level mount 246 to rest substantially flat against the vehicle surface with which it is in contact, such as the top surface of the vehicle's rear bumper 212. The mounting bracket 244 is configured to fixedly attach the mount stabilizer frame 242 to the support frame 214. The mounting bracket 244 includes a plurality of holes 248 disposed thereon to provide for adjustment of the mount stabilizer 218 relative to both the vehicle and the support frame 214 such that the vehicle mounted accessory 210 may be adjusted to mount on various vehicle types and sizes. Optionally, a single mount stabilizer unit 218 may provide sufficient stability for the vehicle mounted accessory 210, without the need for multiple stabilizer units 218 as shown in in the illustrated embodiments of FIGS. 17-22.

Figure 23:
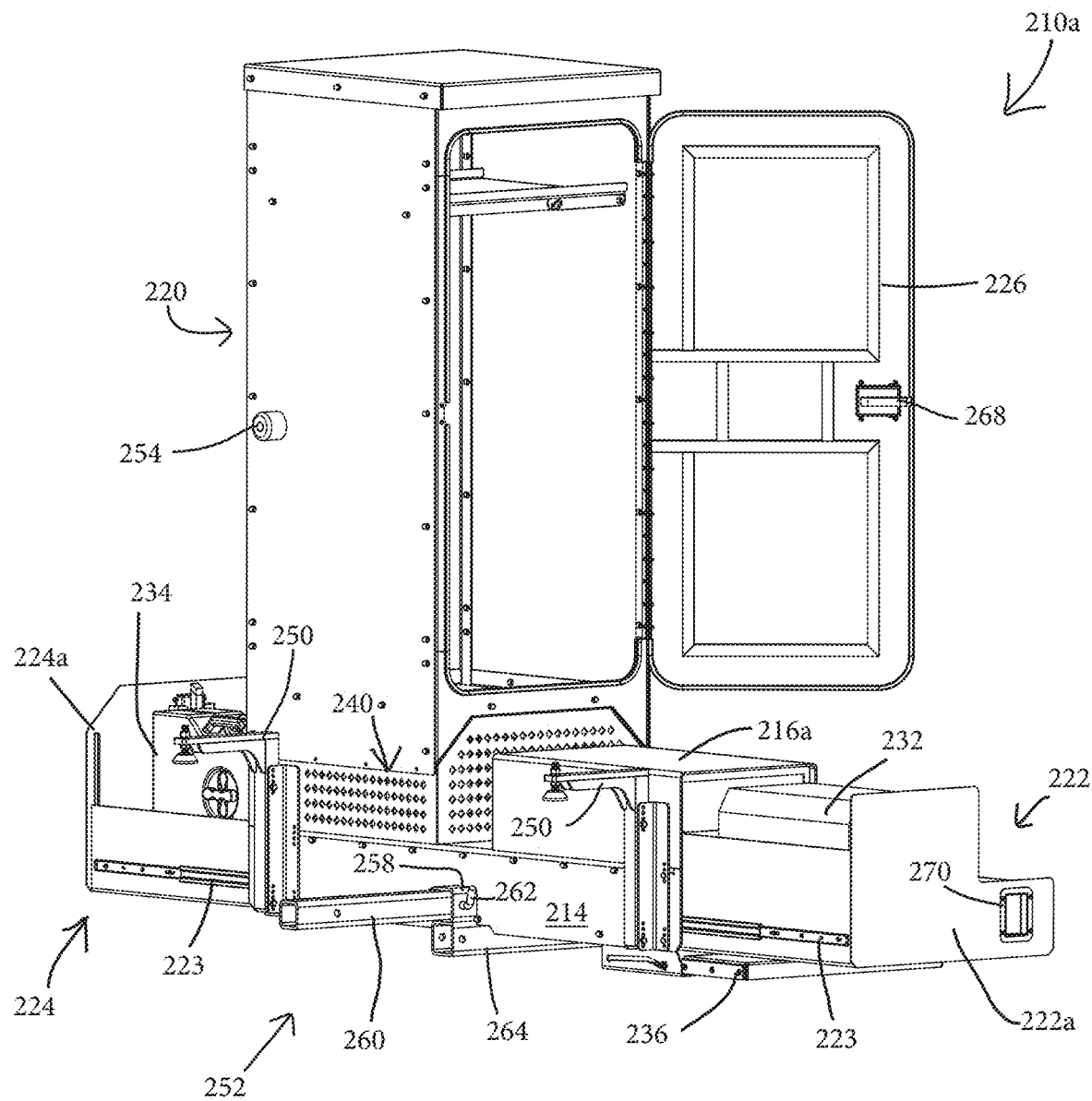
FIG. 23 is a left-front perspective view of another vehicle mounted accessory in accordance with an embodiment of the present invention.
Figure 24:
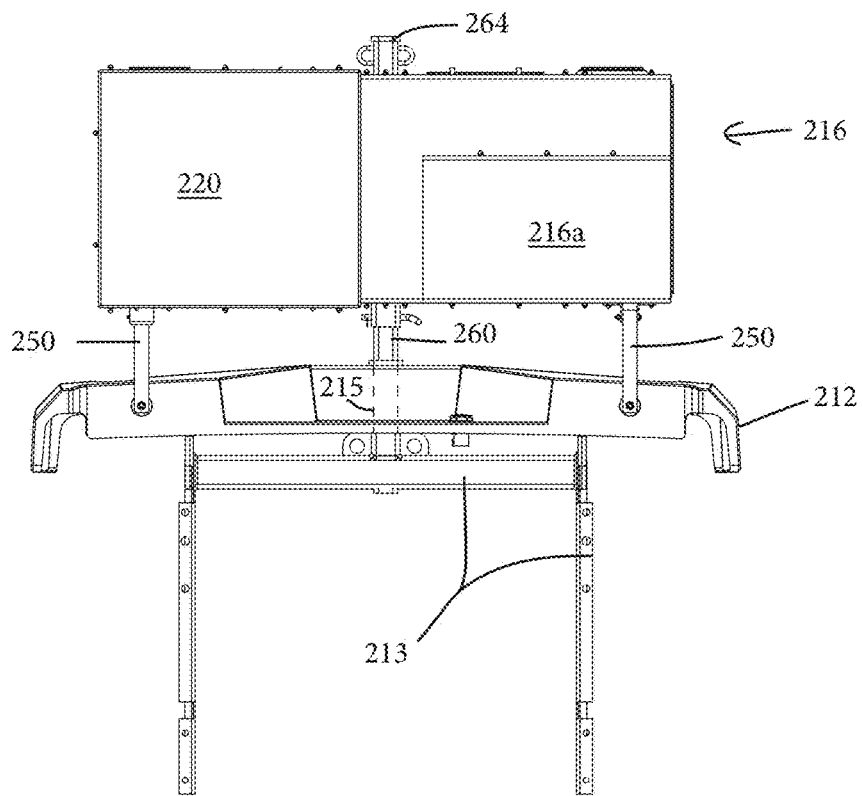
FIG. 24 is a top plan view of the vehicle mounted accessory of FIG. 23, shown mounted to the frame of a vehicle.
Figure 25:
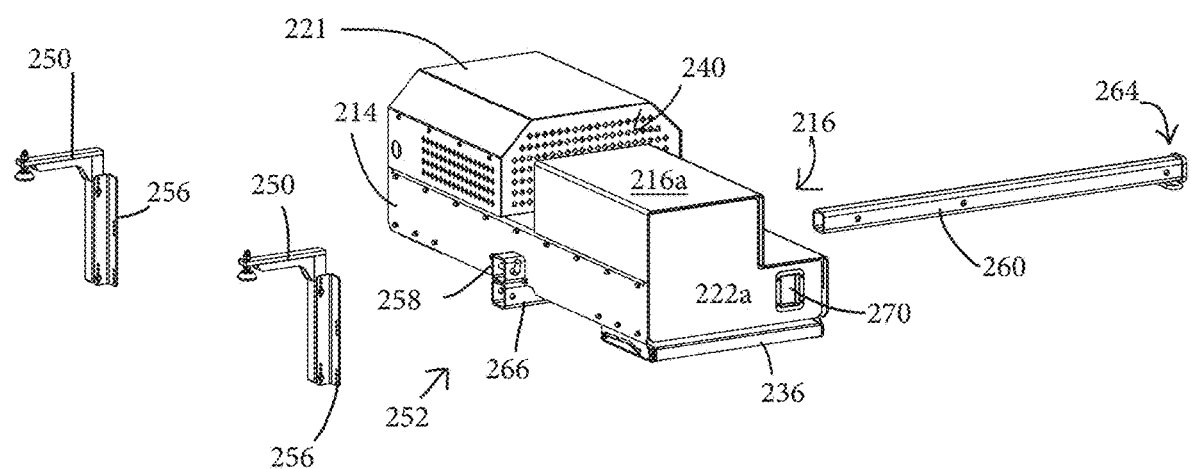
FIG. 25 is a partially exploded left-front perspective view of the vehicle mounted accessory of FIG. 23.

Referring to the illustrated embodiments of FIGS. 23-25, another vehicle mounted accessory 210a is similar to accessory 210 described above, but includes some alternative and/or additional components. As compared to accessory 210, vehicle mounted accessory 210a includes alternative mount stabilizer units or supports 250, an alternative vehicle hitch receiver mount system 252, and a bumper or pad 254. The bumper 254 is attached to an upper portion of the vehicle mounted accessory 210, such as on the forward exterior surface of the closest 220, and provides a shock absorbing spacer to reduce or eliminate damage from contact between the accessory 210 and the truck camper 22. The mount stabilizers 250 each include a frame and an adjustable level mount identical to that of mount stabilizers 218. The mount stabilizer 250 includes an adjustable mounting bracket 256 which functions similar to bracket 244 of stabilizer 218, however bracket 256 is larger than bracket 244.

The hitch receiver mount system 252 of FIGS. 23-25 is provided as an alternative to hitch receiver mount 219. Receiver mount system 252 includes hitch receiver channel or receiver tube 258 fixed to a lower portion of the support frame 214. The channel 258 extends between the front and rear of the frame 214 and is hollow throughout the entire channel. The channel 258 is dimensioned such that it can receive a removable receiver extension tube 260. Typically, the channel will have a cross-sectional dimension configured to receive a standard trailer hitch (standard trailer hitch sizes: 1¼", 2", 2½" and 3"), however, it is contemplated that custom or non-traditional shapes and dimensions may be provided. The extension tube 260 is dimensioned to be insertable into the channel. The extension tube 260 has a length that is greater than the length of the channel 258 such that a portion of the extension tube 260, when fully inserted through the front of the channel 258, extends beyond a rear-end of the channel 258. As such, the exposed portion of the extension 260 that extends beyond the channel 258 is insertable into a hitch receiver 215 of the vehicle (FIG. 24). The extension 260 can be secured in the channel with a hitch pin 262.

The hitch receiver mount system 252 provides for simplified, single-operator attachment of the vehicle accessory 210a to the vehicle 12. In order to mount the accessory 210 having the hitch receiver mount 219, the user must either maneuver to vehicle directly and precisely into alignment between the vehicle hitch receiver 215 and the mount 219, or the user (possibly with help from others or machinery) must maneuver the vehicle accessory 210 toward the vehicle while aligning the mount 219 with the vehicle hitch receiver. The hitch receiver mount system 252 allows the user to maneuver the vehicle accessory into the proper position relative to the vehicle 12 such that the vehicle hitch receiver 215 and the channel 258 are properly aligned. Then, the user simply inserts the extension tube 260 through the channel 258 and into the vehicle hitch receiver. Removal of the vehicle accessory 210a is likewise simplified, wherein the user supports the accessory 210a against the ground or surface proximate the vehicle and then removes the extension tube 260 from the vehicle hitch receiver and then the channel 258.

The front end (i.e. the non-inserting end) 264 of the extension tube 260 may function as a hitch receiver, to enable a trailer to be hitched to the vehicle while the vehicle mounted accessory 210a is installed on the vehicle (FIGS. 24 and 25). Additionally, a second hitch receiver channel 266 may be provided below or adjacent to channel 258. The second channel 266 may provide an additional relative height position of the vehicle accessory 210a relative to the vehicle and/or may provide for a different size extension tube 260 to allow the accessory to fit with multiple vehicles which have different hitch receivers 215. Further, the front end 264 of the extension tube, the front end of channel 258, or the front end of the second channel 266 may provide various hitch receiver sizes to allow a user to mount various trailers or other accessories having different receiver hitch mount sizes to the vehicle while the vehicle accessory 210a is mounted on the vehicle.

Thus, the vehicle mounted accessory of the present invention is installed onto or integrated with a vehicle such as a pickup truck with a truck bed camper, and provides convenient storage and/or access for users of the vehicle and/or camper. In one embodiment, the vehicle mounted accessory includes a deployable access platform or "porch" that provides a landing or place to stand for a user adjacent to a portion of the vehicle, such as a bed of a truck. Alternatively, a non-deployable access platform is provided. A single deployable step or a set of deployable stairs nests underneath or inside of the access platform and can be deployed to provide improved access to reach the access platform. A storage unit is coupled to the vehicle mounted accessory to provide storage or support for equipment, tools, and other accessories, such as for fuel tanks. The storage unit may include a closet, a drawer, and/or a bin. The storage unit can support a piece of equipment, such as an electricity generator, that can be secured inside of or onto the exterior of the storage unit. The access platform may be pivotable to be stowed for travel and to be deployed for use to access the vehicle. The access platform and storage unit may also be slideable along a support frame of the vehicle mounted accessory to allow a user to position the access platform and storage unit as necessary relative to a portion of the vehicle.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A vehicle-mountable accessory comprising:
    a support frame configured to removably couple to a vehicle;
    an access platform fixedly or pivotably supported at said support frame, said access platform comprising a standing surface for a user;
    a deployable stair coupled to said access platform, said deployable stair configured to provide access to said access platform when in a deployed position, wherein said deployable stair is movable to a stowed position at said access platform; and
    a storage unit supported at said support frame adjacent said access platform, wherein said storage unit comprises an accessible interior for storage of equipment and accessories, said interior defined by a plurality of exterior panels comprising an openable access panel and an upper panel.

2. The vehicle-mountable accessory of claim 1, wherein said access platform is pivotably coupled to said support frame and selectively operable to move between a stowed platform configuration wherein said standing surface of said access platform is upright relative to the vehicle and a deployed platform configuration wherein said standing surface of said access platform is substantially horizontal.

3. The vehicle-mountable accessory of claim 1, wherein said access platform comprises an access platform frame having a hollow interior portion, and said deployable stair is configured to nest within the hollow interior of said access platform frame, and said deployable stair is operable to slideably deploy from said hollow interior portion and to then pivot downward at an oblique angle relative to said access platform.

4. The vehicle-mountable accessory of claim 3, wherein said deployable stair comprises a pair of stair stringers and a plurality of stair treads disposed in spaced arrangement between and perpendicular to said stringers.

5. The vehicle-mountable accessory of claim 4, wherein said deployable stair further comprises a guide pin disposed on a respective proximal end portion of each of said stair stringers to support said stringers at said access platform frame, and said access platform frame comprises a guide channel disposed on an interior of each of said sidewalls of said access platform frame, wherein each of said guide channels is configured to guide and support a respective one of said guide pins while said deployable stair is moving between a nested stair configuration in which said deployable stair is nested within said access platform frame and a deployed stair configuration wherein said deployable stair is oriented such that said stair treads are parallel to a top portion of said access platform.

6. The vehicle-mountable accessory of claim 5, wherein said deployable stair is operable to slide out from said access platform until said guide pins reach ends of said guide channels, and when said guide pins reach the ends of said guide channels, said deployable stair is pivotable at said guide pins.

7. The vehicle-mountable accessory of claim 6, wherein said deployable stair includes a stop configured to abut an end portion of said access platform frame to support and retain said deployable stair in the deployed stair configuration.

8. The vehicle-mountable accessory of claim 1, wherein said support frame comprises a hitch receiver mount.

9. The vehicle-mountable accessory of claim 8, wherein said hitch receiver mount comprises a removable extension that is insertable into a hitch receiver channel that extends from a front portion of said support frame to a rear portion of said support frame, wherein when said removable extension is fully inserted into the channel, a portion of said removable extension extends beyond a rear-end of said channel such that the exposed portion of said removable extension is insertable into a hitch receiver of the vehicle.

10. The vehicle-mountable accessory of claim 8, wherein said support frame further comprises a stabilizer for reducing movement of said vehicle-mountable accessory relative to the vehicle when said vehicle-mountable accessory is mounted to the vehicle.

11. The vehicle-mountable accessory of claim 1, wherein said support frame comprises a vertical support and a coupling collar, wherein said coupling collar is configured to removably couple said vertical support to a jack support of a truck-bed mounted camper that is mounted on the vehicle.

12. The vehicle-mountable accessory of claim 1, wherein said access platform is selectively slidable along said support frame.

13. A vehicle-mountable accessory comprising:
    a support frame configured to removably couple to a vehicle;
    an access platform fixedly or pivotably supported at said support frame, said access platform comprising a standing surface for a user;
    a deployable stair coupled to said access platform, said deployable stair configured to provide access to said access platform when in a deployed position, wherein said deployable stair is movable to a stowed position at said access platform; and
    a slidable storage drawer operably disposed with said support frame, said slidable storage drawer defining an accessible interior for storage of equipment and accessories, wherein said accessible interior of said slidable storage drawer is nestable within a portion of said support frame.

14. The vehicle-mountable accessory of claim 13, further comprising a storage unit supported at said support frame adjacent said access platform, wherein said storage unit comprises an accessible interior for storage of equipment and accessories, said interior defined by a plurality of exterior panels comprising an openable access panel and an upper panel.

15. The vehicle-mountable accessory of claim 14, further comprising an accessory coupling platform removably coupled to said storage unit proximate said upper panel, said accessory coupling platform configured to couple to a functional accessory and to secure the functional accessory to said storage unit.

16. A vehicle-mountable accessory comprising:
    a support frame configured to removably couple to a vehicle;

an access platform coupled to said support frame and configured to provide a standing surface for a user to occupy adjacent the vehicle;

a deployable stair coupled with said access platform and operable to selectively provide a user with access to said access platform;

a storage unit supported at said support frame adjacent said access platform;

a first drawer that is laterally retractable into said support frame directly below said access platform, and laterally extendable outwardly away from said support frame; and a second drawer that is laterally retractable into said support frame directly below said storage unit, and laterally extendable outwardly away from said support frame.

17. The vehicle-mountable accessory of claim 16, further comprising a bin disposed below said storage unit, said bin comprising a perforated panel to provide ventilation to said second drawer when in the retracted position.

18. The vehicle-mountable accessory of claim 17, further comprising an electrical generator mounted in said second drawer and a cooking grill mounted in said first drawer.

19. A vehicle-mountable accessory comprising:
a support frame configured to removably couple to a vehicle;
an access platform coupled to said support frame and configured to provide a standing surface for a user;
a storage unit supported on said support frame;
a hitch receiver mount at said support frame for mounting at a vehicle hitch receiver of the vehicle; and
a stabilizer extending forwardly from said support frame to engage the vehicle, for limiting movement of said vehicle-mountable accessory relative to the vehicle when said vehicle-mountable accessory is mounted to the vehicle.

20. The vehicle-mountable accessory of claim 19, further comprising a deployable step coupled to said support frame, wherein said deployable step is selectively deployable from said support frame to provide access to said access platform.

* * * * *